US011372625B2

(12) United States Patent
Tanguy et al.

(10) Patent No.: US 11,372,625 B2
(45) Date of Patent: Jun. 28, 2022

(54) TOOL COMPILER

(71) Applicant: BROOKS AUTOMATION (GERMANY) GmbH, Radolfzell (DE)

(72) Inventors: Francois Tanguy, Larmor-Plage (FR); Andreas Decker, Loechgau (DE)

(73) Assignee: BROOKS AUTOMATION (GERMANY) GMBH

( * ) Notice: Subject to any disclaimer, the term of this patent is extended or adjusted under 35 U.S.C. 154(b) by 0 days.

(21) Appl. No.: 16/660,669

(22) Filed: Oct. 22, 2019

(65) Prior Publication Data

US 2020/0050435 A1 Feb. 13, 2020

Related U.S. Application Data

(60) Division of application No. 15/882,735, filed on Jan. 29, 2018, now Pat. No. 10,452,362, which is a continuation of application No. 14/220,076, filed on Mar. 19, 2014, now Pat. No. 9,880,817.

(60) Provisional application No. 61/803,427, filed on Mar. 19, 2013.

(51) Int. Cl.
*G06F 8/35* (2018.01)
*G06F 8/73* (2018.01)
*G06F 40/117* (2020.01)
*G06F 40/131* (2020.01)
*G06F 40/154* (2020.01)
*G06F 40/186* (2020.01)

(52) U.S. Cl.
CPC ............. *G06F 8/35* (2013.01); *G06F 8/73* (2013.01); *G06F 40/117* (2020.01); *G06F 40/131* (2020.01); *G06F 40/154* (2020.01); *G06F 40/186* (2020.01)

(58) Field of Classification Search
CPC ....... G06F 40/14; G06F 40/117; G06F 40/131; G06F 40/154; G06F 40/186; G06F 8/35; G06F 8/71; G06F 8/73
USPC .................................................. 717/101–135
See application file for complete search history.

(56) References Cited

U.S. PATENT DOCUMENTS

| 5,485,615 | A | 1/1996 | Wennmyr |
| 6,681,383 | B1 | 1/2004 | Pastor et al. |
| 6,996,799 | B1 | 2/2006 | Cismas et al. |
| 7,574,688 | B1 | 8/2009 | Ward et al. |
| 8,522,221 | B1 | 8/2013 | Braun et al. |
| 9,335,761 | B2 | 5/2016 | Case et al. |
| 9,880,817 | B2 | 1/2018 | Tanguy et al. |
| 2002/0062475 | A1* | 5/2002 | Iborra ............... G06F 16/2365 717/108 |

(Continued)

FOREIGN PATENT DOCUMENTS

| EP | 1615125 | 1/2006 |
| JP | 2003186512 | 7/2003 |

(Continued)

*Primary Examiner* — Marina Lee
(74) *Attorney, Agent, or Firm* — Pearne & Green, LLP; Colin C. Durham

(57) ABSTRACT

Automatic generation of documentation and software for an equipment or tool, together with an automatic synchronization between the corresponding documentation and software can be preformed with a tool model representation. The tool model can include a textual, graphical, symbolic, and program representation of the tool. Default components, derived components, and standard components can be added to the tool model.

12 Claims, 31 Drawing Sheets

(56) References Cited

U.S. PATENT DOCUMENTS

| | | |
|---|---|---|
| 2004/0030037 A1 | 3/2004 | Damm et al. |
| 2004/0060037 A1* | 3/2004 | Damm ................ G06F 3/04883 |
| | | 717/104 |
| 2006/0064288 A1* | 3/2006 | Ferryanto .............. G06Q 10/00 |
| | | 703/2 |
| 2006/0064669 A1 | 3/2006 | Ogilvie et al. |
| 2006/0248540 A1 | 11/2006 | Stemer et al. |
| 2008/0250062 A1 | 10/2008 | Huang et al. |
| 2009/0239313 A1 | 9/2009 | Anemikos et al. |
| 2014/0289698 A1 | 9/2014 | Tanguy et al. |
| 2018/0239594 A1 | 8/2018 | Tanguy et al. |

FOREIGN PATENT DOCUMENTS

| | | |
|---|---|---|
| JP | 2006031610 | 2/2006 |
| TW | 588246 | 5/2004 |
| TW | 591536 | 6/2004 |

* cited by examiner

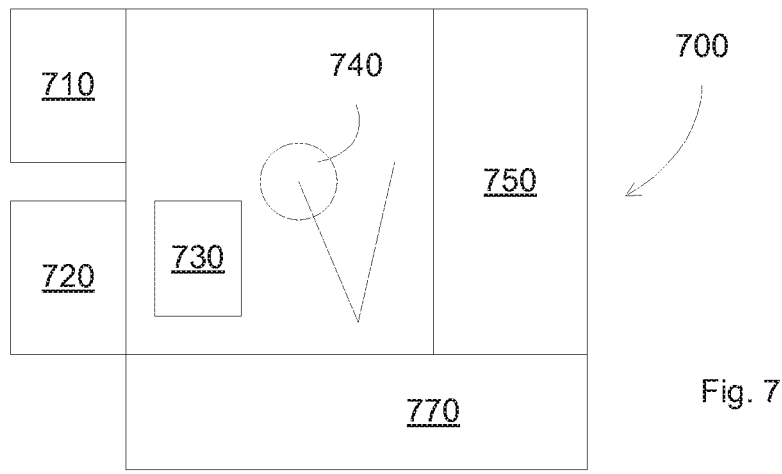

Fig. 7

Name
Reticle Stocker
760

States
Maintenance
Initialization
Running Test Cycles
Production Ready
761

Commands
Pre-cond: ToolEnable

Cmd 1: Clear Fault
Cmd 2: Stop
762

Status
Overall status
Vacuum status
Power status
Air Pressure status
Maintenance status
Error status
EMO status
763

Equipment
Equip 1: Load Lock 1 710
Equip 2: Load Lock 2 720
Equip 3: Rotation Station 730
Equip 4: Robot 740
Equip 5: Storage chamber 750
Equip 6: Support 770
764

Error
Err 1: Load Lock 1 error
Err 2: Load Lock 2 error
Err 3: Rotation Station error
Err 4: Robot error
Err 5: Reticle error
Err 6: Storage chamber error
Err 7: Support error
Err 8: Connection error
Err 9: Equipment error
Err 10: Initialize error
Err 11: Unknown error
765

Tool Model
Integration of modules
780

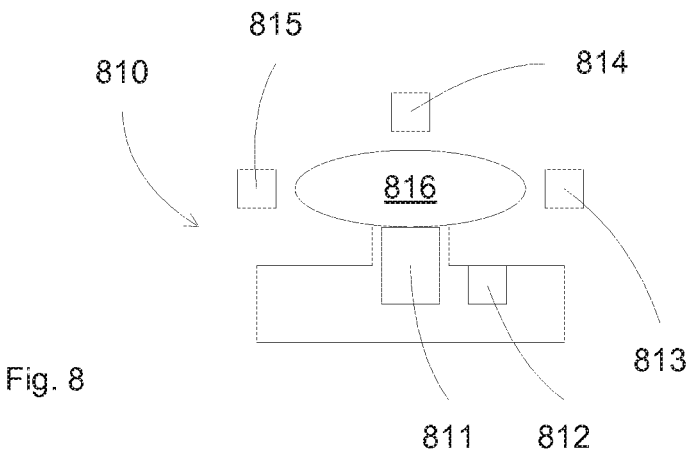

Fig. 8

| Name<br>Rotation Station 810<br>860 | States<br>Position 0<br>Position 90<br>Position 180<br>With reticle<br>Without reticle<br>863 |
|---|---|
| Commands<br>Pre-cond: ToolEnable<br><br>Cmd 1: Rotate 0<br>Cmd 2: Rotate 90<br>Cmd 3: Rotate 180<br>Cmd 4: Clear Fault<br>Cmd 5: Stop<br>861 | Equipment<br>Equip 1: Motor 811<br>Equip 2: Reticle sensor 812<br>Equip 3: Position 0 sensor 813<br>Equip 3: Position 90 sensor 814<br>Equip 3: Position 180 sensor 815<br>864 |
| Error<br>Err 1: Motor error<br>Err 2: Position 0 error<br>Err 3: Position 90 error<br>Err 4: Position 180 error<br>Err 5: Reticle error<br>Err 6: Connection error<br>Err 7: Equipment error<br>Err 8: Initialize error<br>Err 9: Unknown error<br>862 | Status<br>Reticle present<br>Is position 0<br>Is position 90<br>Is position 180<br>Is in error<br>865 |

Tool Model Module - Rotation Station
880

Preparing a tool model wherein the tool model comprises a text, figure, and/or program description of the tool
900

Fig. 9A

Preparing an individual tool model for each module of a tool, wherein the individual tool model comprises a text, figure, and/or program description of the tool module
910

Preparing an integrated tool model for the tool, wherein the integrated tool model comprises a text, figure, and/or program description of the tool in term of tool modules
920

Preparing a tool model for the tool, wherein the tool model comprises the individual tool models and the integrated tool model
930

Fig. 9B

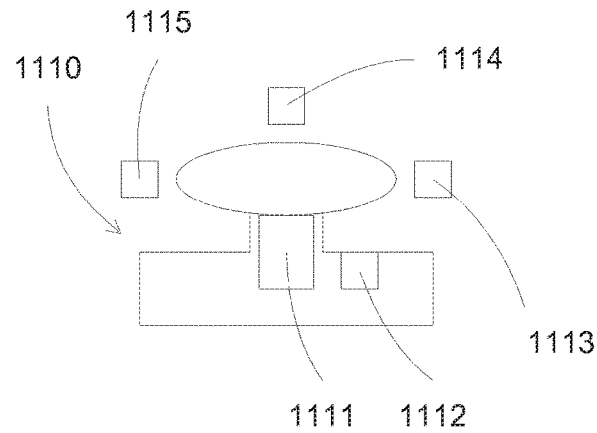
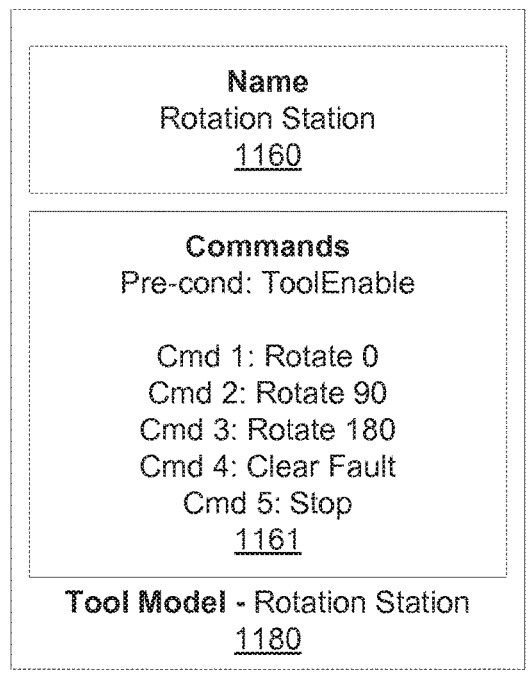
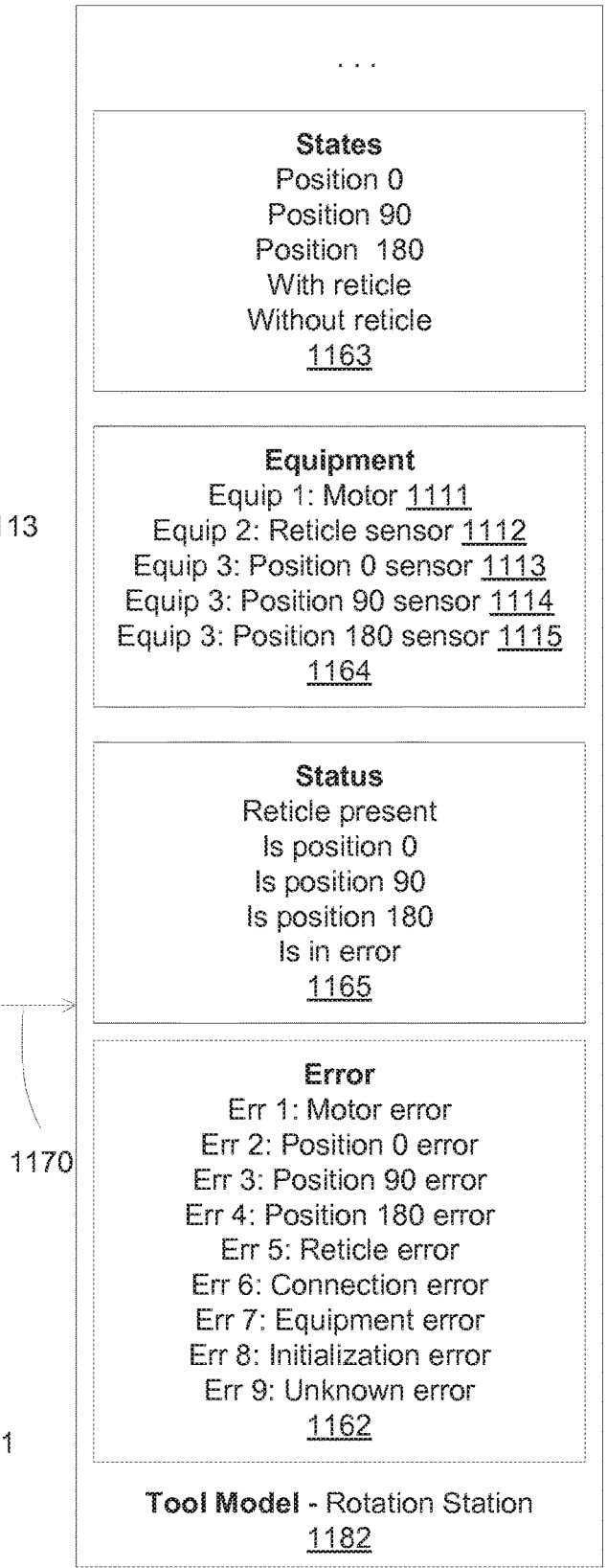
Fig. 11

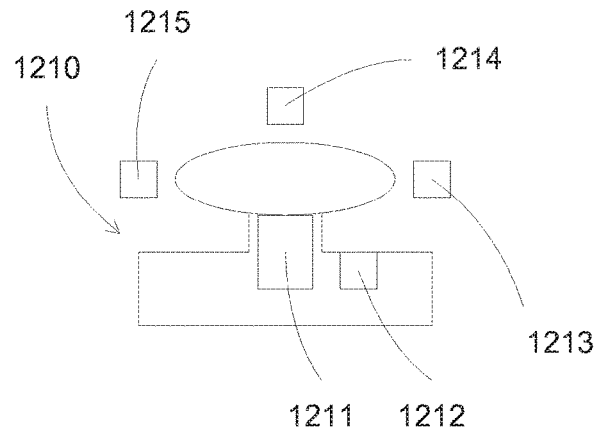
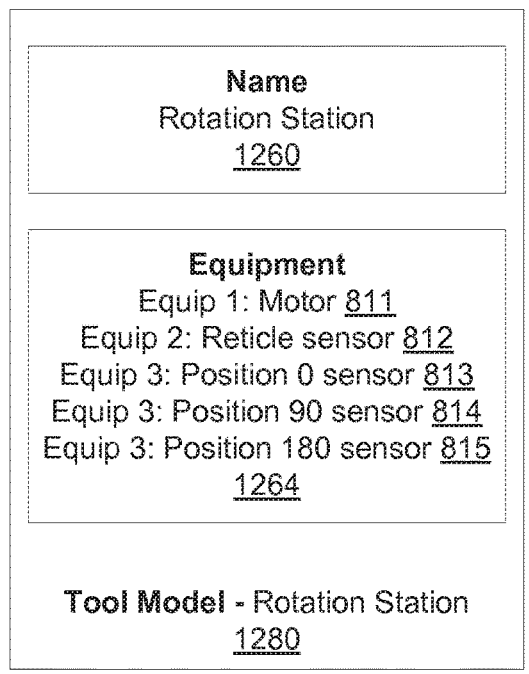
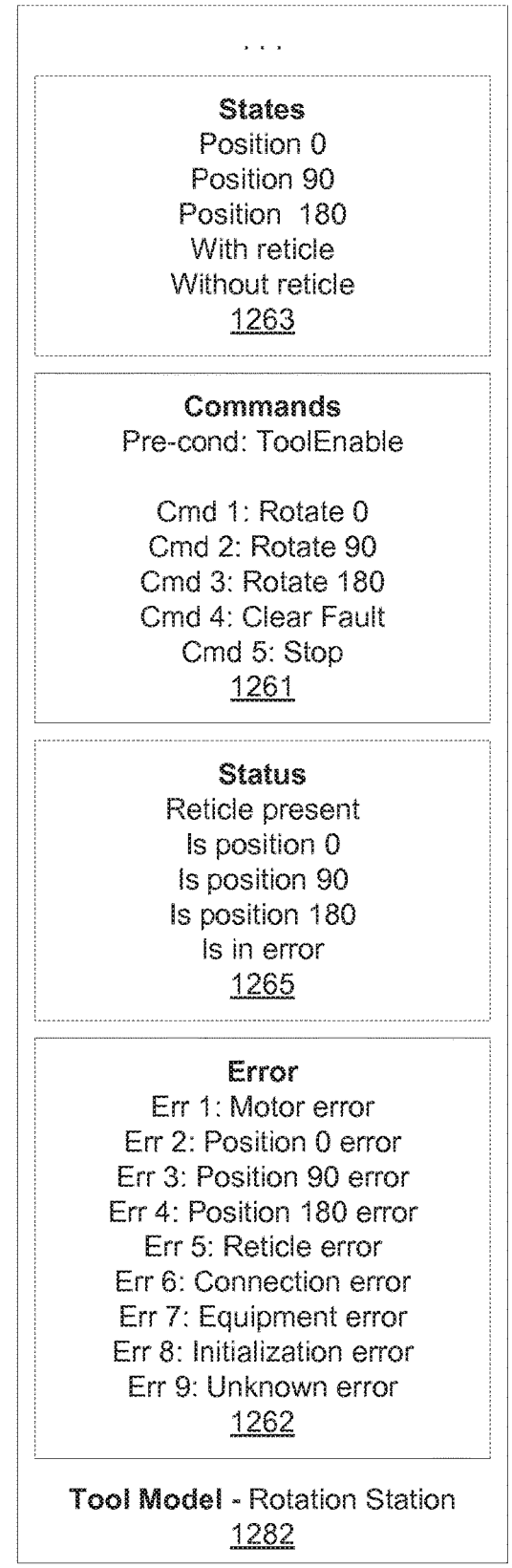
Fig. 12

Person makes a file containing a tool model wherein the tool model comprises a text, figure, and/or program description of the tool
1510

Fig. 15A

Person fills a template to make a file containing a tool model wherein the tool model comprises a text, figure, and/or program description of the tool
1520

Fig. 15B

Person fills a template to make a file containing a tool model, wherein the tool model comprises a text, figure, and/or program description of the tool, wherein the template is interactive with prompt based on inputs
1530

Fig. 15C

Running a program, using a brief tool model, to make a file containing a detailed tool model wherein the tool model comprises a text, figure, and/or program description of the tool
1540

Fig. 15D

Running a program, using a brief tool model, to make a file containing a detailed tool model wherein the tool model comprises a text, figure, and/or program description of the tool, wherein the program is interactive with prompt for guidance
1550

Fig. 15E

```
┌─────────────────────────────────────┐
│  Determining functions of a software program  │
│                2700                 │
└─────────────────────────────────────┘
                   │
                   ▼
┌─────────────────────────────────────┐
│ Generating a software program template to perform
│              the functions,
│ wherein the software program comprise place-
│              holder commands,
│ wherein the software program comprise command
│                structures,
│ wherein the software program comprises a graphical
│                interface,
│ wherein the software program comprise default
│                functions
│                 2710
└─────────────────────────────────────┘
```

Fig. 27

Generating a software template, wherein the software template program is configured to operate a tool, wherein the software template program comprises place-holder commands
2900

Fig. 29A

Generating a plurality of modules of a tool
2920

Generating commands and status for each module
2930

Generating commands and status for running the tool
2940

Generating data collection procedures
2950

Generating mapping procedures to replace the commands and status
2960

Fig. 29B

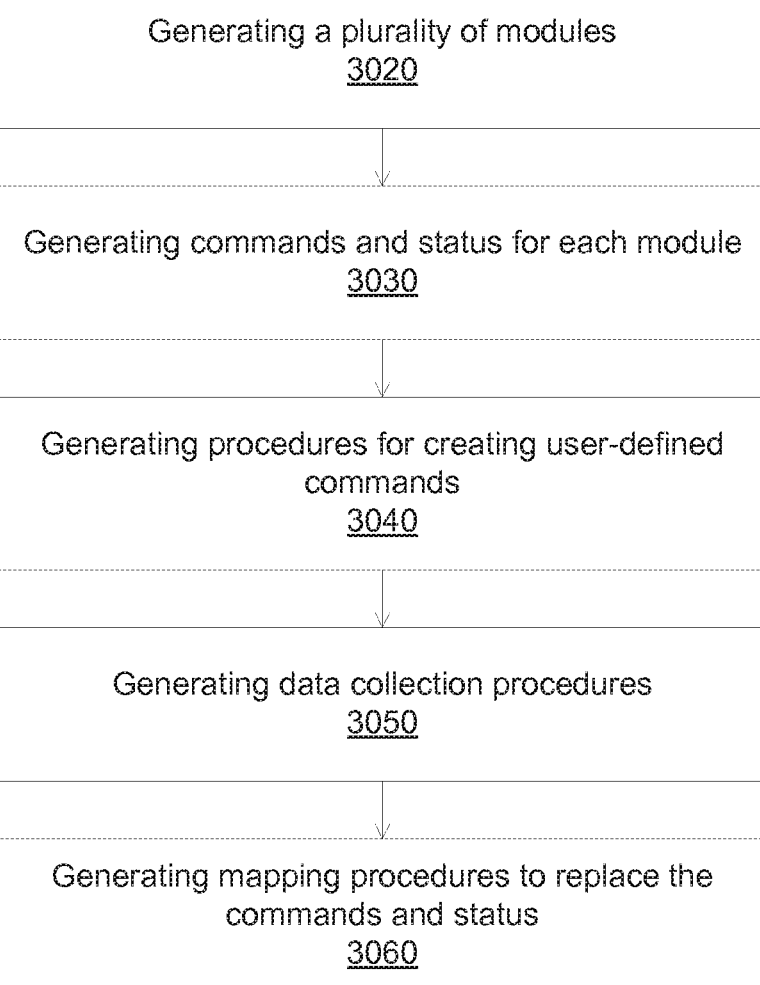

Generating a tool model of a tool
3110

Automatically generating a documentation of the tool based on the tool model
3120

Automatically generating a software of the tool based on the tool model,
wherein the documentation and the software are automatically synchronized
3130

Fig. 31A

Amending a tool model of a tool
3150

Automatically generating a documentation of the tool based on the amended tool model
3160

Automatically generating a software of the tool based on the amended tool model,
wherein the documentation and the software are automatically synchronized for the amendment
3170

Fig. 31B

TOOL COMPILER

CROSS REFERENCE TO RELATED APPLICATIONS

This application is a divisional of U.S. patent application Ser. No. 15/882,735, filed on Jan. 29, 2018 (now U.S. Pat. No. 10,452,362, issued Oct. 22, 2019), which is a continuation of U.S. patent application Ser. No. 14/220,076, filed on Mar. 19, 2014 (now U.S. Pat. No. 9,880,817, issued Jan. 30, 2018), which claims priority from and the benefit of U.S. Provisional Patent Application No. 61/803,427, filed on Mar. 19, 2013, the disclosures of which are incorporated herein by reference in their entireties.

BACKGROUND

A compiler is a computer program that translates an input high-level language. For example, programming compilers are special programs that translate a high-level language into the internal language of a particular computer. High-level languages generally have a precise syntax or grammar, which defines the structures for statements in the language. A file containing a program in its high-level language form is known as a source code. The compiled form of a programming program is generally known as object code. Examples of programming compilers include FORTRAN compilers, PASCAL compilers, and C, C++, C# compilers.

Similarly, digital circuit designers have developed HDL (Hardware Description Language), a standardized language to describe digital circuits. HDL can allow circuit designers to design and document an electronic system at various levels of abstraction, such as at the architectural or behavioral level as well as the lower implementation levels of transistor and circuit block levels. An HDL design can be a representation of the electronic circuit, providing testing and optimization of integrated circuit chip layouts and functionality verification. For example, circuit designs to be implemented in programmable logic devices, such as field programmable gate arrays or application specific integrated circuits, can be modeled using an HDL.

Currently, hardware description language compilers are not currently available for tool or equipment. Therefore, it is desirable to provide a tool compiler that can generate a tool model representation, e.g., in hardware description languages, to represent an equipment or tool.

SUMMARY

In some embodiments, systems and methods are provided for automatic generation of documentation and software for an equipment or tool, together with an automatic synchronization between the corresponding documentation and software. The methods can include generating a model representation of a tool, followed by running a program using the tool model as inputs to generate corresponding documentation and software.

In some embodiments, systems and methods are provided for generating a tool model representation of a tool. The tool model can include a textual, graphical, symbolic, and program representation of the tool. For example, the tool model can include textual and graphical descriptions of the tool, such as a description of the tool functions, including the commands that the tool can execute. The tool model can include software program, such as source codes or object codes that can provide an interface with the tool so that the tool can perform the commands.

In some embodiments, systems and methods are provided for generating a more detailed tool model representation based on a tool model input of a same tool. A simplified tool model representation can be prepared by a person. The simplified tool model then can be processed, for example, by a. software program, to return a more detailed or more complete tool model representation.

In some embodiments, systems and methods are provided for a template for the generation of more detailed tool models, for example, from a tool model input. A file containing the default components, the derived components, the standard components, and other components can be created to assist in the generation of a more detailed tool model.

In some embodiments, systems and methods are provided for generating a documentation of a tool based on a tool model input. The documentation can be a user manual, a software operation manual, a service manual, a maintenance manual, a repair manual, or any other types of documentation. The tool model can be a generic tool model, having description of components of the tool to allow the generation of a document. The tool model can be a specific tool model, having description of components of the tool to allow the generation of a specific document.

In some embodiments, systems and methods are provided for generating a software program of a tool based on a tool model input. The software program can be an operating software, a built software, a servicing software, a reliability testing software, a diagnostic software, or any other software programs. The tool model can include software components, such as object codes or source codes to allow accessing the hardware components, together with possible commands for operate the hardware modules.

In some embodiments, systems and methods are provided for a software template for the generation of a software program from a tool model input. The software template can be configured to perform a function for a tool. The software template can contain place-holder commands, graphic elements, input and output files. By mapping a tool model to the software template, a software program specific for the tool can be automatically generated.

BRIEF DESCRIPTION OF THE DRAWINGS

FIG. 7 illustrates an example of a tool model for a module integration of a reticle stocker according to some embodiments.

FIG. 8 illustrates an example of a tool model for a rotation station module according to some embodiments.

FIGS. 9A-9B illustrate flow charts for the generation of a tool model according to some embodiments.

FIG. 11 illustrates a generation of other description from a tool model according to some embodiments.

FIG. 12 illustrates a generation of other description from a tool model according to some embodiments.

FIGS. 15A-15E illustrate flow charts for generating a tool model according to some embodiments.

FIG. 27 illustrates a flow chart for generating a software template according to some embodiments.

FIGS. 29A-29B illustrate flow charts for generating a software template according to some embodiments.

FIGS. 30A-30B illustrate flow charts for generating a software template according to some embodiments.

FIGS. 31A-31B illustrate flow charts for generating a software according to some embodiments.

DETAILED DESCRIPTION OF THE DISCLOSED EMBODIMENT

Figure 1:
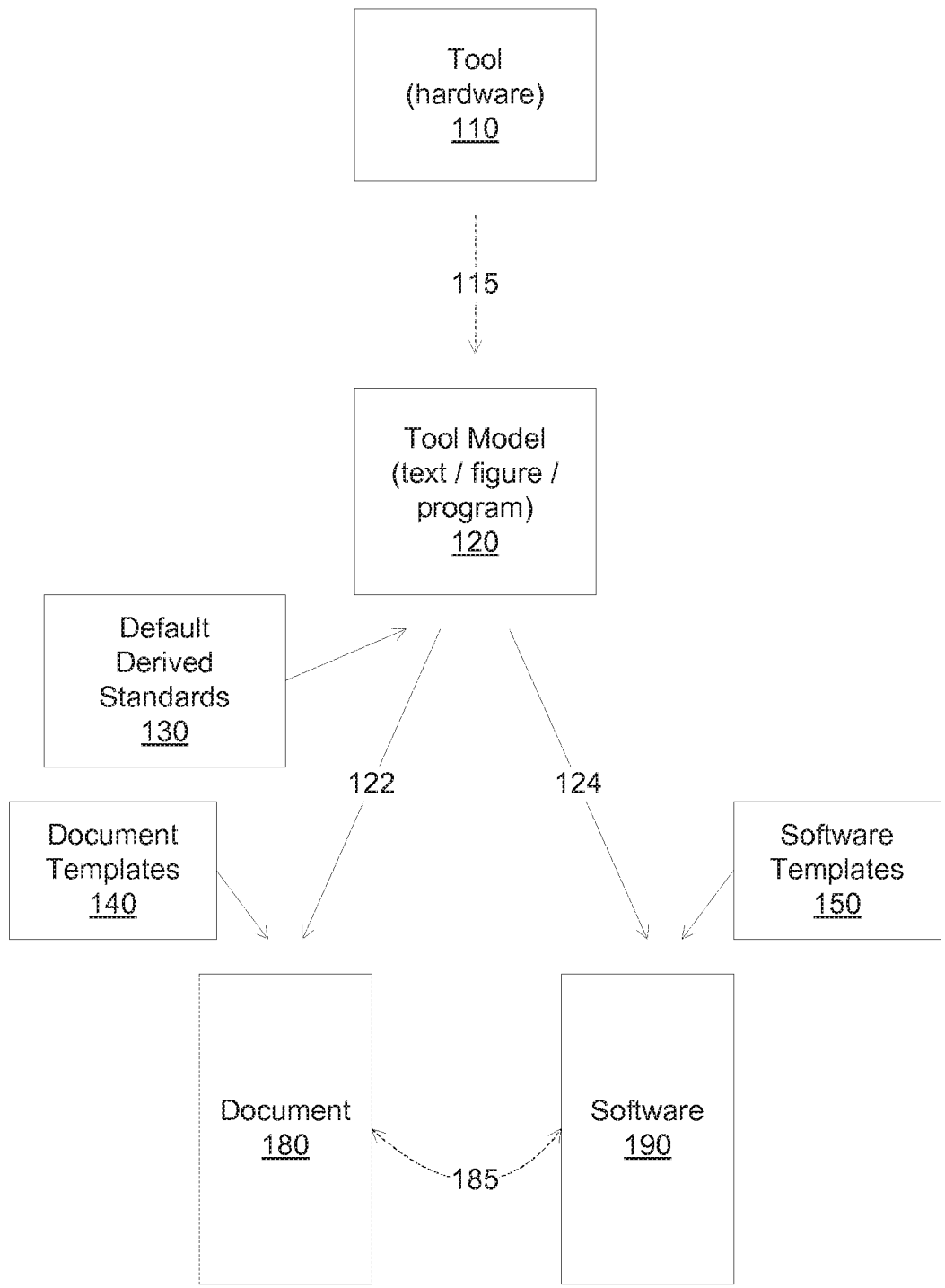
FIG. 1 illustrates a schematic process for tool modeling according to some embodiments.

In some embodiments, systems and methods are provided for a representation of hardware equipment and to the translation of the hardware representation to documentation and software in multiple languages.

In some embodiments, systems and methods are provided for a tool compiler, which includes a program to translate an equipment or a tool description into a user defined functionality for the tool, such as a tool documentation or a software program running on the tool.

In some embodiments, systems and methods are provided for high level language description development, which can be used for translating an equipment or tool, e.g., by a tool compiler, into a user defined functionality, such as a tool representation, a tool manual, or a tool software.

In some embodiments, systems and methods are provided for simplifying operator involvement in the tool translation, using databases, templates, or rule-based components to assist in provide a desired tool representation, such as to add default components or functions, add derived components or functions from available components, or to add or modify components to satisfy a regulation, such as safety regulations or standard regulations.

In some embodiments, systems and methods are provided for automatic generation of documentation and software for an equipment or tool, together with an automatic synchronization between the corresponding documentation and software. The methods can include generating a model representation of a tool, followed by running a program using the tool model as inputs to generate corresponding documentation and software. The tool model can be updated when the tool is updated, e.g., adding a component, replacing a component with a different component, or removing a component of the tool. The program can be run on the updated tool model, e.g., using the updated tool model as a new input, to generate updated documentation and/or software.

In some embodiments, a tool compiler program is provided, which can accept input of a tool model representation of a tool, and which can generate a desired output, which can be an user defined functionality such as a documentation or a software for the tool. The tool compiler can be linked to a library, a database, a template, or other programs to simplify the requirements of the tool model input. For example, the tool compiler can be linked to a formatting template and/or a style template to generate a tool documentation or a tool software with a desired format and style. For example, the template program can have place-holder commands, textual information and graphic representation of the tool. The linkage with the tool model can replace the place-holder components with actual data to allow the software to be specific to the tool. The tool compiler can be linked to a standard documentation or program to generate a tool documentation or a tool software which satisfies the standardization requirement of the tool. The tool compiler can be linked to a default or derived document, program or template to simply the tool model generation, and still generate a tool documentation or a tool software with needed components and elements. For example, state models for a tool sequence can be added by knowing the states or the components of the tool.

The documentation and software can be generated from a single tool model, thus automatic synchronization can be assured. For example, the tool model can be updated to form a new version of the tool model, which can be used to generate a new version of documentation and software. The update can be a software update, which can result in an automatic update of the corresponding documentation through the updated tool model. The update can be a documentation update, which can result in an automatic update of the corresponding software through the updated tool model.

FIG. 1 illustrates a schematic process for tool modeling according to some embodiments. An equipment or tool 110 can be translated into a tool model 120, which includes a hardware description language representation, such as textual representation, figural representation, symbolic representation, or object code representation. The tool model 120 can be translated or converted, for example, by a software program or a tool compiler 122 or 124, to a document 180 or a software program 190, respectively. Additional elements 130 can be incorporated to the tool model 120, such as adding default components, components derived from the existing components, or components added to satisfy a standard regulation. In addition, document templates 140 can be utilized in the automatic generation of the documentation 180. Software templates. 150 can also be utilized in the automatic generation of the software program 190.

In some embodiments, the documentation 180 can be the manual of the software program 190. Since the document 180 and the software 190 are generated from a same tool model 120, automatic synchronization 185 between the manual and the program can be assured. Automatic synchronization can be achieved during the update of the software or the manual.

In some embodiments, tools model, and methods to form tool models, are provided. The tool model can be a transformable representation of related equipment or tool. The representation can be transformable into another type of tool models, such as corresponding detailed tool model, e.g., tool model with additional default elements, derived components, or components to allow conformation with established standards.

In some embodiments, multiple tool models can be linked together to model a large tool. For example, a tool model for a large tool can include multiple tool model modules, which can be further divided into subsets of modules. The module subsets can be linked, providing an efficient method to create a tool model for a large tool model.

In some embodiments, systems and methods are provided for generating a tool model representation of a tool. The tool model can include a textual, graphical, symbolic, and program representation of the tool. For example, the tool model can include textual and graphical descriptions of the tool, such as a description of the tool functions, including the commands that the tool can execute. The textual and graphical description of the tool can also include a description of the components of the tool, such as motors, sensors, pressure gauge, robotic handler, etc. The description can include text and figures. The tool model can include software program, such as source codes or object codes that can provide an interface with the tool so that the tool can perform the commands. For example, the tool model can include an object code for a sensor to allow a linkage by a software program to read the sensor status after hardware communication has been established.

In some embodiments, the tool model can include a complete or partial representation of the tool. Further, the completeness of the tool model can be determined by a purpose of the tool model. For example, a complete tool model designed for documentation generation can have the textual and graphical information without the program components.

In some embodiments, the tool model can include a simplified representation of the tool, e.g., a bare minimum of description, without any redundancy. For example, the tool model can include the description of the components of the tool, without the different states or functions of the tool, the safety description of the tool, or the standard conformance of the tool.

Figure 2:
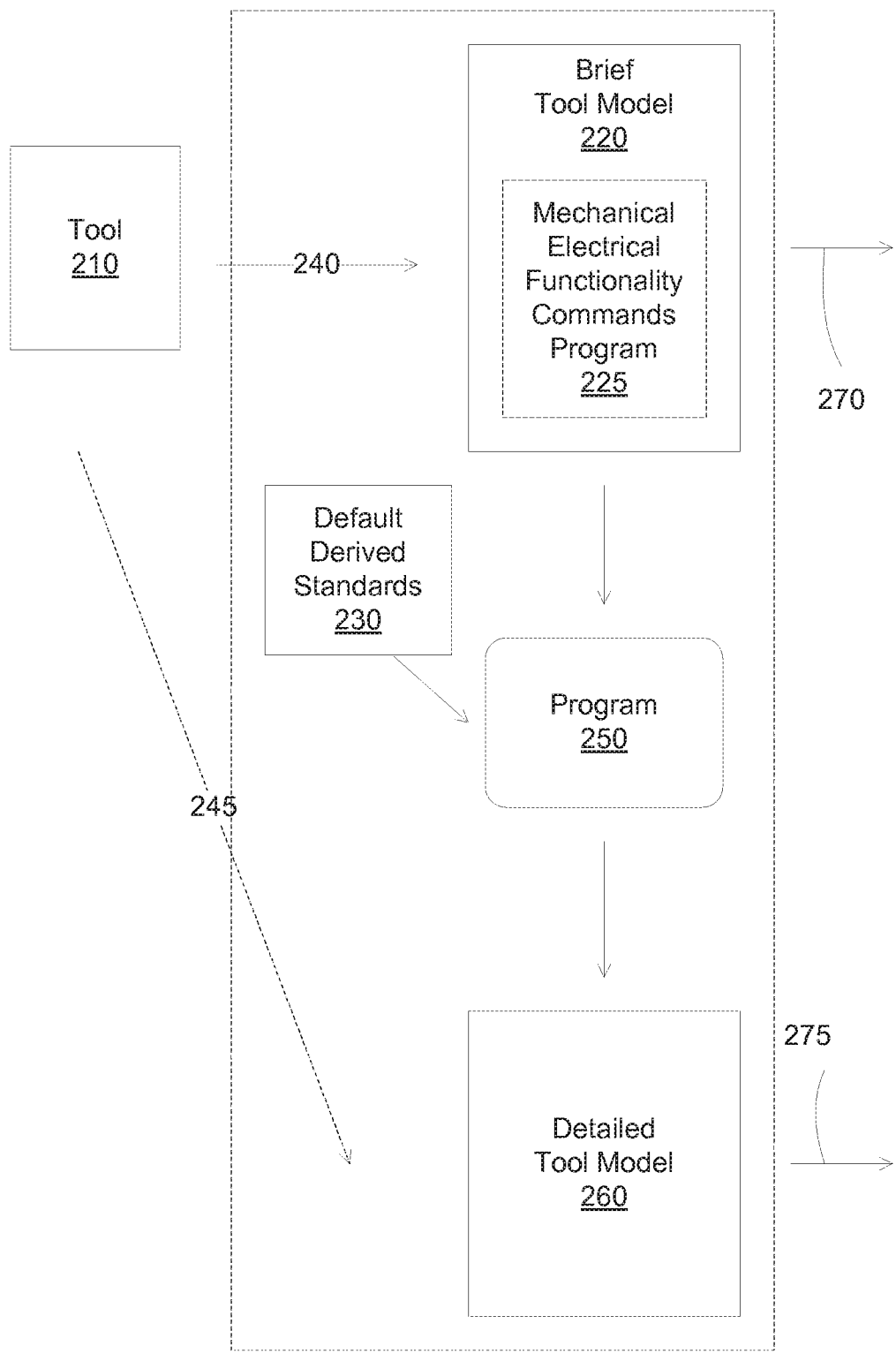
FIG. 2 illustrates a schematic of a tool model according to some embodiments.

FIG. 2 illustrates a schematic of a tool model according to some embodiments. A tool 210, e.g., an equipment such as a semiconductor processing tool, can be translated 240 to a brief tool model 220. The brief tool model 220 can include mechanical electrical functionality commands program 225.

Alternatively, the tool 210 can be translated 245 into a more detailed tool model 260. The translation can be performed by a person, for example, by providing a description of the tool. The conversion can generate a hardcopy or a softcopy of the tool, e.g., a file containing a representation of the tool. The conversion can be performed by a person, so the brief tool model 220 can be generated, which then can be automatically converted by a program 250 which can also accept default derived standards 230 as input to the more detailed tool model 260. A database, template, or other file or program can be linked to the program 250 to assist in the conversion. The tool model 220 or 260 then can be converted or translated 270 or 275 to a desired functionality, such as a document or a program for the tool 210.

Figure 3:
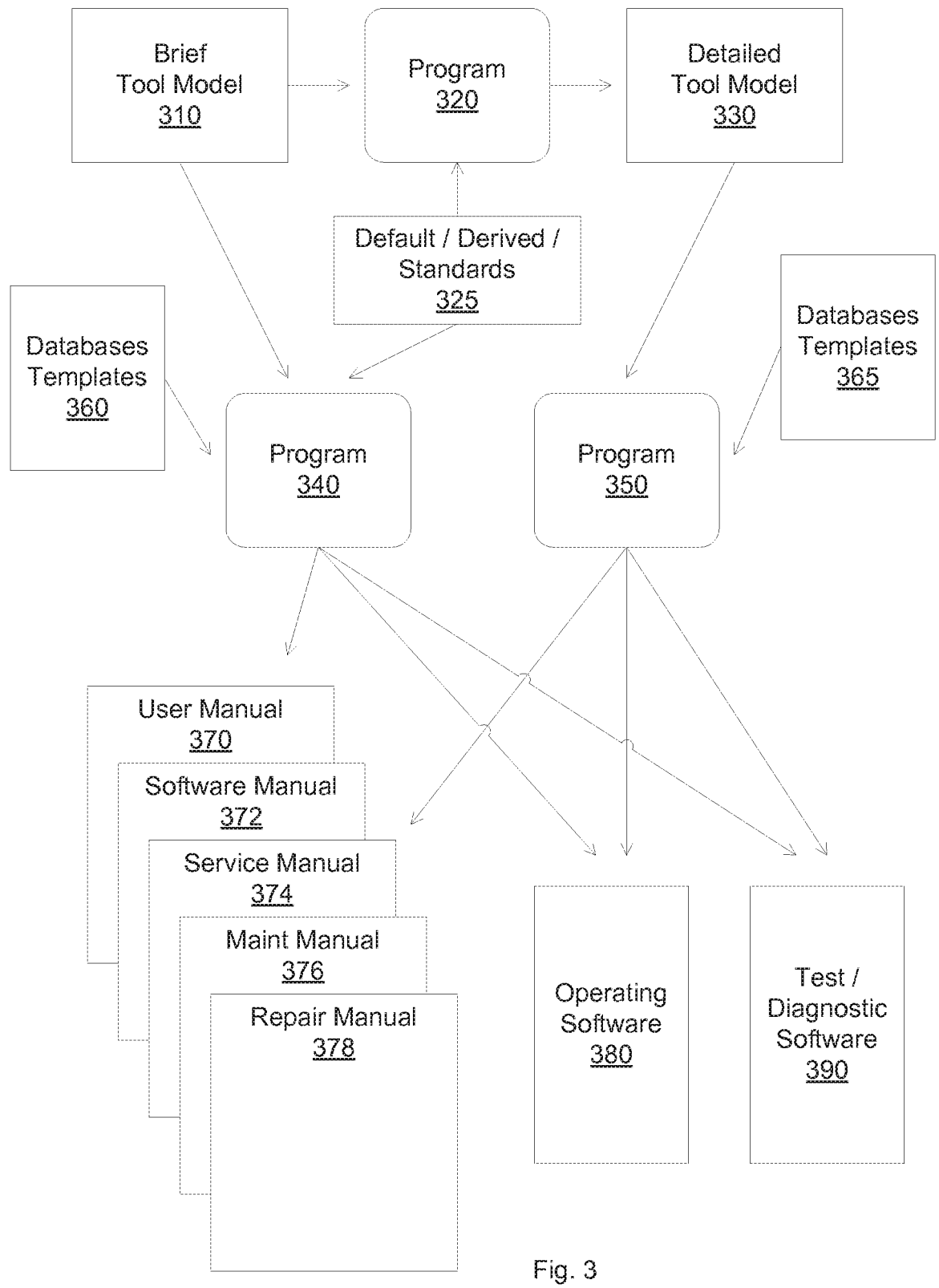
FIG. 3 illustrates a schematic process for tool modeling according to some embodiments.

FIG. 3 illustrates a schematic process for tool modeling according to some embodiments. An equipment or tool can be translated into a tool model 310. The tool model 310 can be translated or converted, for example, by a software program or a tool compiler 340, to different manuals, such as user manual 370, software manual 372, service manual 374, maintenance manual 376, repair manual 378, or other types of manual. The tool model 310 can be translated or converted to different software programs, such as operating software 380, test software 390, diagnostic software, built software, or other types of software. Different files 325 can be incorporated into the program 340 to provide default components, derived components, standard components, or other additional components for the tool model. In addition, database templates 360, such as document format or style templates, can be used to provide a desired format or style to the documentation 370-378. Software format or style templates can be used to provide a desired format or style to the software 380 or 390.

Alternatively, the tool model 310 can be converted by a program 320 to a more detailed tool model 330. The more detailed tool model 330 can have the incorporation of default components, derived components, and standard components from a database or file 325. The tool model 330 can be translated or converted, for example, by a software program or a tool compiler 350, to different manuals, such as user manual 370, software manual 372, service manual 374, maintenance manual 376, repair manual 378, or other types of manual. The tool model 330 can be translated or converted to different software programs, such as operating software 380, test software 390, diagnostic software, built software, or other types of software. Database templates 365, such as document format or style templates, can be used to provide a desired format or style to the documentation 370-378. Software format or style templates can be used to provide a desired format or style to the software 380 or 390.

In some embodiments, a tool model can be created by a design or parsing of the tool. A tool model representation can be created by describing elements or components of the tool into corresponding textual, graphic, symbolic, or object code representation. Each element or component of the tool, for example, can be described in term of hardware elements, e.g., a motor, a sensor, etc., in term of functionalities, e.g., rotating to position 0, rotating to position 90, etc., or in term of states or state models, e.g., position 0, position 90, rotating from position 0 to position 90, etc.

In some embodiments, systems and methods can be implemented to create a representation of an equipment according to user-selected functionality. For example, a user may employ the systems to create a document associated with the equipment.

For example, the system can translate the tool model representation, using appropriate interfaces, databases, and/or templates, into a user manual, a service manual, a repair manual, an operating software and corresponding operating software user manual, or a built/test/diagnostic software and corresponding software user manual.

The tool model representation can facilitate the transformation or conversion of the tool into other target objects. For example, the target objects can include a manual, e.g., documentation of the tool, or software, e.g., program to run the tool. A tool compiler, in some embodiments, can also facilitate manipulation, derivation, and/or modification of the respective objects.

In some embodiments, each of the modules in the equipment can be implemented as a tool model module. Each tool model module, for example, represents methods, properties, functions, and/or other characteristics associated with the module represented by the tool model module. A tool model-based representation can be used to facilitate manipulation and modification of tool models. In addition, other elements or components can be derived from the modules in the tool model representation.

Figure 4:
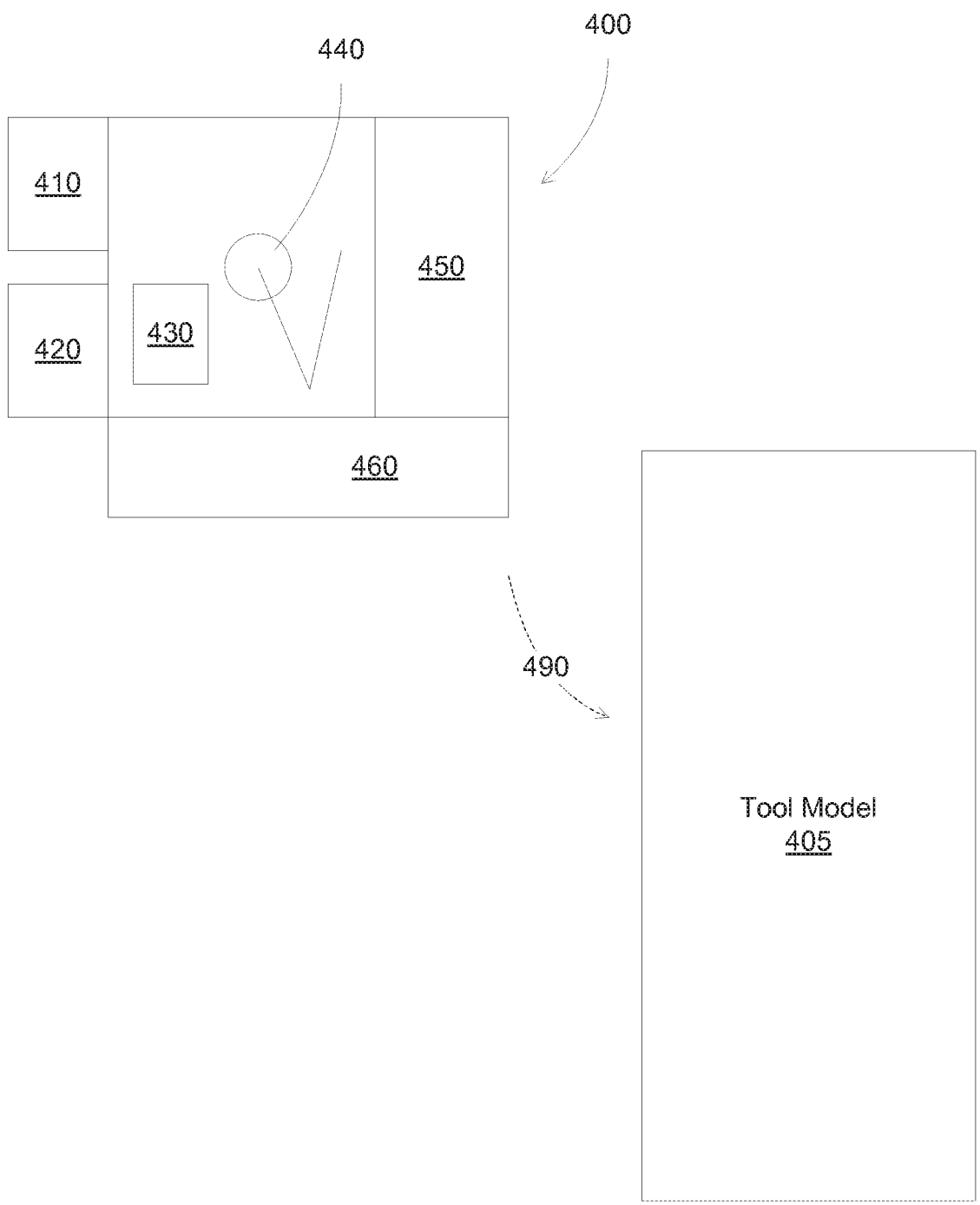
FIG. 4 illustrates a schematic of a tool model generation according to some embodiments.

FIG. 4 illustrates a schematic of a tool model generation according to some embodiments. A reticle storage 460 can include different modules, such as load lock modules 410 and 420, a rotation module 430, a robot handler module 440, a storage module 450, and support module 460. Reticles stored in pods can be provided to either load lock 410 or 420, which can be picked up by the robot handler 440. The reticle can be placed at the rotation station 430 to be aligned and read the identification of the reticle. Afterward, the reticle can be picked up again to be placed in the storage 450. Support module 460 can provide vacuum support, gas delivery, power and software control to the operation of the reticle storage system 400. The reticle storage system 400 can be translated 490 to a tool model 405, which can contain a description of the reticle storage 400.

Figure 5:
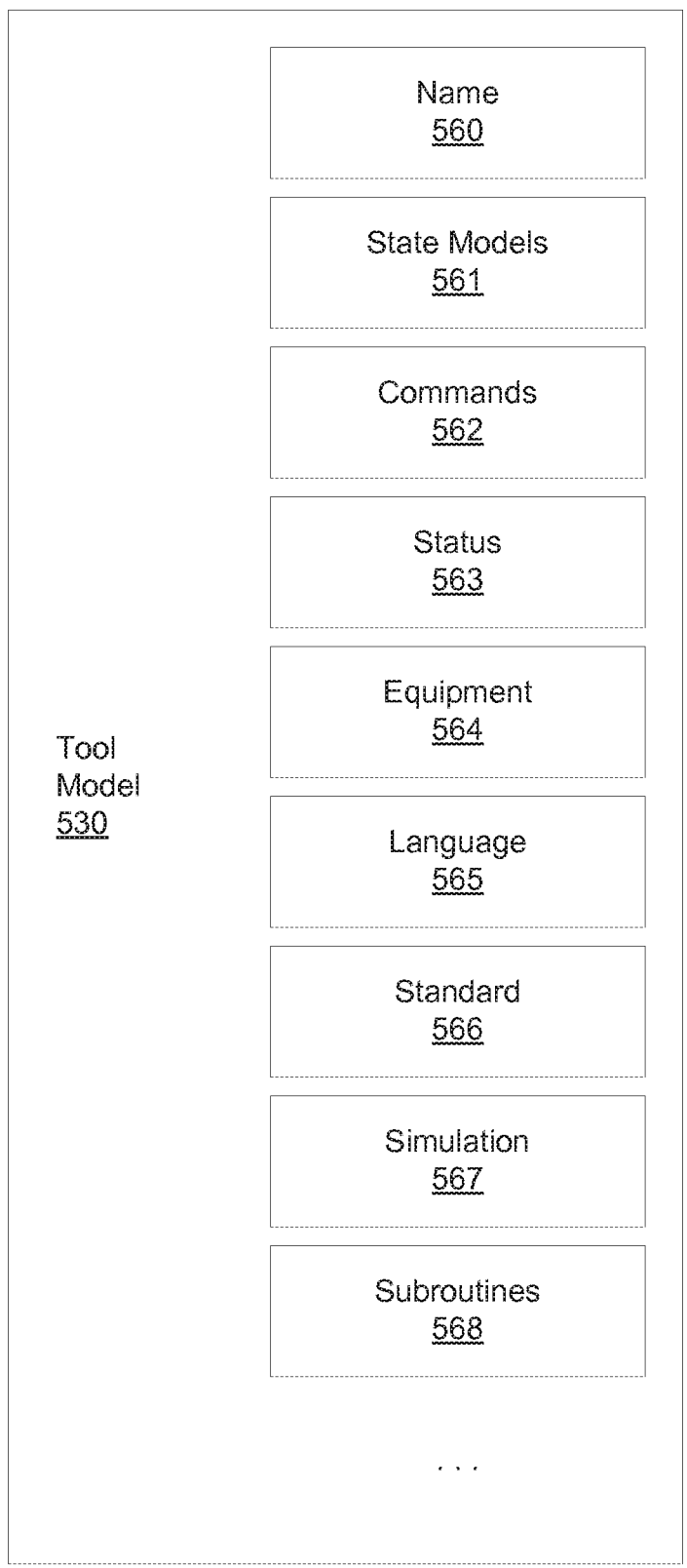
FIG. 5 illustrates a schematic of a tool model according to some embodiments.

FIG. 5 illustrates a schematic of a tool model according to some embodiments. A tool model 530 can include a name portion 560, which can also include a description of the tool. For example, for a reticle storage, the name portion 560 can include the name of reticle stocker, and a description that the reticle stocker is a storage of reticles. The tool model 530 can include a state model portion 561, which can include the states of the tool, such as on-line state, off-line state, reticle ready to be transferred, reticle at rotation station, etc. State transitions can also be included, such as a transition from on-line state to off-line state, or a transition from reticle at load lock state to reticle at rotation station state. The state models 561 can include diagrams showing different linkages of states and state transitions for the tool. The tool model 530 can include a command portion 562, which can include loading reticle command, retrieve reticle command, rotating reticle command, reading reticle id command. The tool model 530 can include a status portion 563. The tool model 530 can include an equipment portion 564, which can include load lock module, rotation module, robot module, storage module, and support module. Individual equipment of the modules can also be described. The tool model 530 can include a language portion 565, such as i18n files, which can allow machine translation of the tool model output to different languages. i18n refers to the process of designing a software application so that it can potentially be adapted to various languages and regions without engineering changes, together with the process of adapting internationalized software for a specific region or language by adding locale-specific components and translating text. The tool model 530 can include a standard portion 566, which can provide the incorporation of components that are required by regulation or standards. The tool model 530 can include a simulation portion 567, which can allow the generation of tool simulation, e.g., running the tool without some components. The tool model 530 can include a subroutine portion 568, such as object codes to rotate a motor or to read a sensor, which can allow the conversion of the tool model to a software program. Other portions can also be included, such as a linkage to an external file, for example, to simplify the tool model readability.

In some embodiments, a tool model can include multiple portions, such as the tool models for different modules. A tool module can be a set of hardware components of a tool. For example, a tool module can be a motor, or can be a rotation station, which includes a rotatable motor and multiple sensors for detecting the position of the movement.

Figure 6:
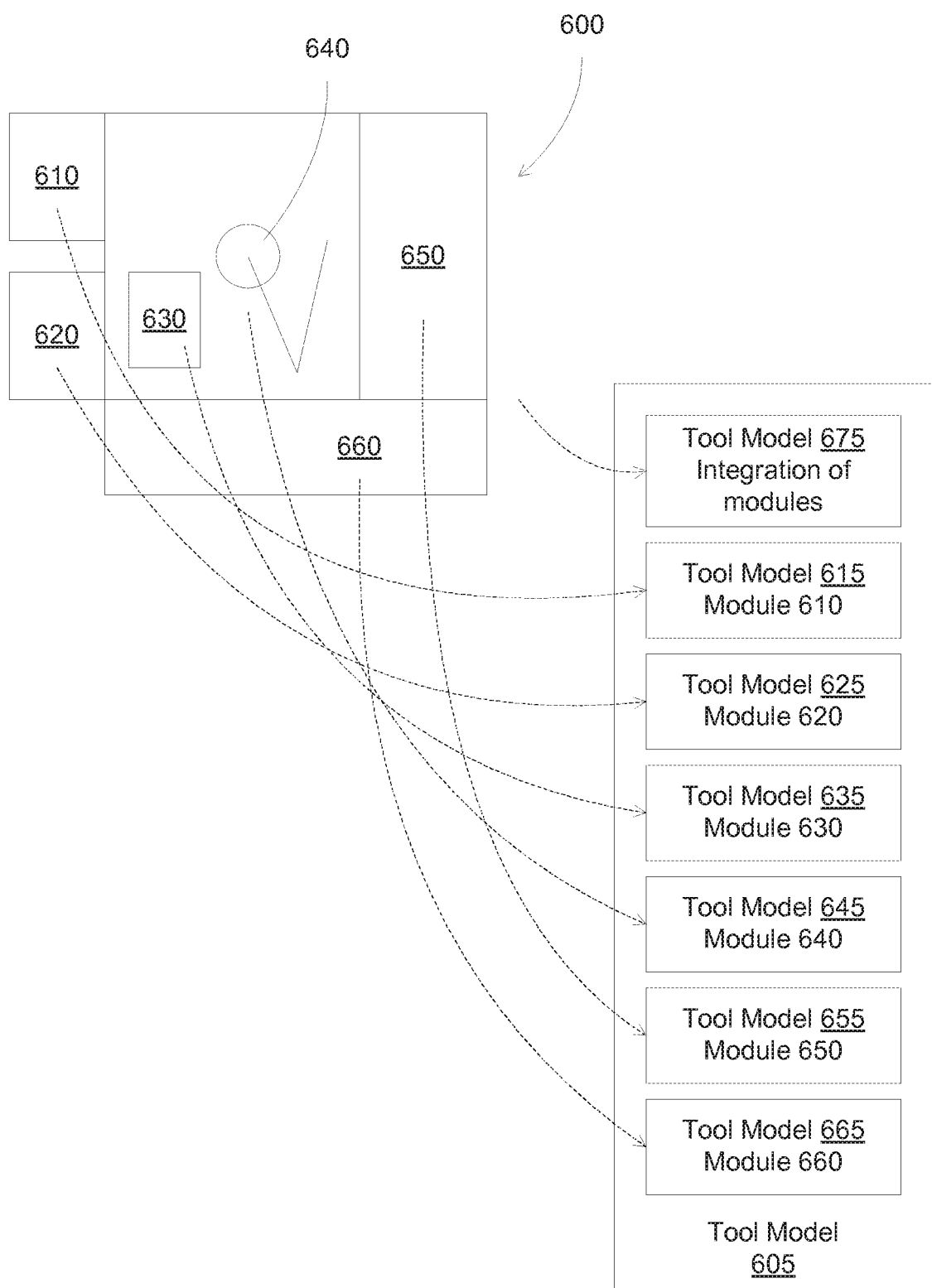
FIG. 6 illustrates a schematic of a translation of tool into a multi-module tool model according to some embodiments.

FIG. 6 illustrates a schematic of a translation of tool into a multi-module tool model according to some embodiments. A reticle storage 600 can include different modules, such as load lock modules 610 and 620, a rotation module 630, a robot handler module 640, a storage module 650, and support module 660. The reticle storage 600 can be translated to a tool model 605, which includes different tool model modules, with each tool model module corresponded to a tool module. For example, the tool model 605 can include a tool model 675 which is a representation of the integration of all the modules of the tool 600. The tool model 605 can include tool models 615 and 625, which contain the description of the load lock modules 610 and 620, respectively. The tool model 605 can include a tool model 635, which contains the description of the rotation station module 630. The tool model 605 can include a tool model 645, which contains the description of the robot handler module 640. The tool model 605 can include a tool model 655, which contains the description of the storage module 650. The tool model 605 can include a tool model 665, which contains the description of the support module 660.

FIG. 7 illustrates an example of a tool model for a module integration of a reticle stocker according to some embodiments. The tool model 780 can include the name 760, the states 761, the commands 762, the status 763, the equipment 764, and the errors 765 portions of the module integration. The tool model 780 contains a description of the integration of different modules, with separate tool models for specific description for the modules. For example, the states 761 of the tool model 780 can contain the various states of the tool 700, such as maintenance state, initialization state, running test cycle state, and production state. The commands 762 can include the commands for operating the tool, such as loading a reticle or retrieving a reticle. The status 763 can include the status of the tool, such as the overall status, the vacuum status, the power status, the air pressure status, the maintenance status, the error status, and the emergency off (EMO) status. The equipment 764 can include the load locks 710 and 720, the rotation station 730, the robot handler 740, the storage chamber 750, and the support module 770. The errors 765 can include the load lock errors, the rotation station error, the robot error, the storage chamber error, the support error, the connection error, the equipment error, the initialization error, and the unknown error.

FIG. 8 illustrates an example of a tool model for a rotation station module according to some embodiments. The rotation station 810 can include a rotation motor 811, which is configured to rotate a substrate 816. The rotation station 810 can also include a sensor 812, which is configured to detect the presence of the substrate 816. The rotation station 810 can also include multiple sensors 813, 814, and 815, which are configured to determine the different position of the rotation. For example, a reticle can be placed in the rotation station in a position that does not allow an id reading. Thus the motor 811 can rotate to different positions to expose the id of the reticle to a reading mechanism, such as a camera.

The tool model 880 for the rotation module 810 can include the name 860, the states 863, the commands 861, the status 865, the equipment 864, and the errors 862 portions of the rotation module. The tool model 880 contains a description of the rotation station 810, with description for the individual components of the rotation station. For example, the states 863 of the tool model 880 can contain the various states of the rotation station 810, such as position 0 state, position 90 state, position 180 state, reticle detected state, and reticle not detected state. The commands 861 can include the commands for operating the rotation station, such as rotate the reticle to position 0, rotate the reticle to position 90, rotate the reticle to position 180, and other commands such as fault clear or stop rotating. The status 865 can include the status of the rotation station 810, such as whether or not a reticle is present, whether or not the motor is at position 0, position 90, or position 180, or whether the rotation station is in error. The equipment 864 can include the motor 811, the reticle sensor 812, and the position sensors 813-815. The errors 862 can include the motor error, the position sensor error, the reticle detection sensor error, the connection error, the equipment error, the initialization error, and the unknown error.

FIGS. 9A-9B illustrate flow charts for the generation of a tool model according to some embodiments. In FIG. 9A, a tool model can be prepared from a tool. The tool model can include a representation of the tool, and thus can allow the generation of various functionalities related to the tool, such as tool documentation or tool software. In operation 900, a tool model is prepared from a tool, wherein the tool model includes a textual description, an image description, a symbolic description, or a program description. A textual description can include paragraphs describe the tool, such as describing the functions of the tool, the components or the tool, or the purpose or states of the tool. An image description can include figures, or software files that can use manipulate using a program (such as a 3D file that can allow zooming, moving, or rotating. A symbolic description, for example, can include a link to an external file or element, which can provide additional information or description of the tool. A program description can include object codes or source codes that allow a software program to operate the tool, for example, by linking to the program.

In FIG. 9B, a tool model including multiple tool modules can be prepared from a tool. In operation 910, individual tool models can be prepared, with each tool model corresponded to a tool module of the tool. The individual tool models can include a textual description, an image description, a symbolic description, or a program description. In operation 920, an integrated tool model is prepared. The integrated tool models can include a textual description, an image description, a symbolic description, or a program description. The integrated tool model can contain the information and description of the interactions between modules. In operation 930, a tool model for the tool is prepared, wherein the tool model includes the individual tool models and the integrated tool model.

In some embodiments, a tool compiler can be provided to transform an equipment or tool to a tool model representation of the equipment, or to a user-selected functionality of the equipment such as documentation or software. The tool compiler can be provided in high level language, and can be further software—compiled into a low—level language, such as an executable assembly or an intermediate language.

A compiler program also can be used to transform the conversion process, e.g., the conversion of a tool model representation into a desired functionality such as tool documentation or software, into a corresponding low-level language, executable or intermediate language representation. The compiler, for example, can use a compiler interface that allows the conversion of a tool model into, e.g., a documentation. The compile interface can return results of a compilation process, such as corresponding object code, an indication of any errors association with the compilation process, and/or a pointer or filename to the created assembly.

In some embodiments, a tool compiler can be employed to transform a tool into a corresponding tool model representation (e.g., a textual, graphical, symbolic, or executable program representation). For example, the tool compiler can utilize an interface having associated interface components that allows a simplified or brief tool model to be converted into a desired tool model representation of the tool. For example, the interface components can include respective components to generate representations for default objects, objects derived from the provided objects, and objects to satisfy a regulation, e.g., standard or safety. The tool model representation can also include international components, such as i18n files, to allow the conversion into any particular language.

In some embodiments, systems and methods and provided relating to the use of High-Level Language (HLL) functions with Tool Hardware Description Language (THDL) to model a tool or an equipment. The methods can include integrating an HLL function with a tool model representation of a tool. The methods can include identifying an attribute of the tool model representation of the tool and determining derivations of the attribute, such as default components, derived components, or components to satisfy a regulation.

In some embodiments, provided are systems and methods for converting a tool to its description representation, and for converting the description representation to a user defined functionality, such as a documentation of a software for the tool. The conversion of a tool model representation to a user defined functionality can be accomplished using a tool compiler that performs the methods.

In some embodiments, the compiler can read or load related link. The link files can facilitate and allow a modular or incremental approach to be used to compile a large tool. The link files can also facilitate and allow inclusion of other needed components or elements. For example, a tool having multiple modules can be represented by many tool model modules.

In some embodiments, systems and methods are provided for generating a more detailed tool model representation based on a tool model input of a same tool. A simplified tool model representation can be prepared by a person. The simplified tool model then can be processed, for example, by a software program, to return a more detailed or more complete tool model representation.

In some embodiments, the detailed tool model can be generated from a program, which can link to a library, a database, a template, or other components to provide the generation process from the tool model input. In some embodiments, the detailed tool model can be generated from an interactive template or program, which can provide additional information based on input from a user.

In some embodiments, the simplified tool model representation can include a description of the tool, and can be designed to minimize the time and effort of the person. For example, essential elements of the tool can be entered to the simplified tool model. Other elements or components can be automatically generated, for example, by a library, a template, or a program.

The simplified tool model can include the physical hardware of the tool, such as motors, sensors, gauges, flow controllers, pressure controllers, vacuum pumps, and heaters. The simplified tool model can include the hardware modules of the tool, such as a rotation station, a robot handler, a storage chamber, support system such as vacuum assembly, gas delivery assembly, electrical delivery, and host communication assembly. For example, a rotation station can be described as having a rotation motor, a sensor to detect the present of a substrate which is configured to be rotated, multiple sensors to detect the location of the rotation motor, such as position at 0 degree, position at 90 degrees, or position at 180 degrees. A reticle storage can be described as having a load lock module, a rotation station module, a robot handler module, a storage chamber module, and a support module to provide mechanical support, electrical support, vacuum support, and communication support.

Other description can also be used, for example, the functionality or the states of the tool. For example, the rotation station can be described as having the functions of detecting a presence of a substrate which is configured to be rotated, and rotating the substrate to position 0 degree, 90 degrees and 180 degree. Alternatively, the rotation station can be described as having multiple states, such as substrate present, substrate not present, rotation at position 0 degree, rotation at position 90 degree, rotation at position 180 degree. A reticle storage can be described as having the function of receiving a reticle to be stored in a storage chamber, retrieving a reticle from the storage chamber, identifying the reticles stored in the storage chamber, counting the available storage compartments for storing reticles, and commands for communication with a host system.

Figure 10A:
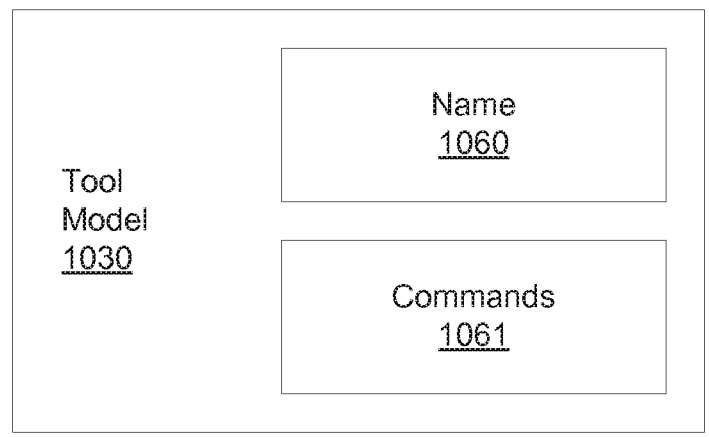
FIGS. 10A-10C illustrate various examples of simplified tool models according to some embodiments.
Figure 10B:
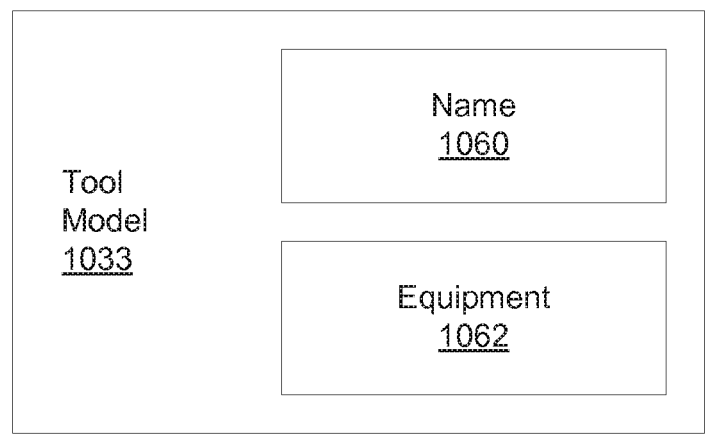
Figure 10C:
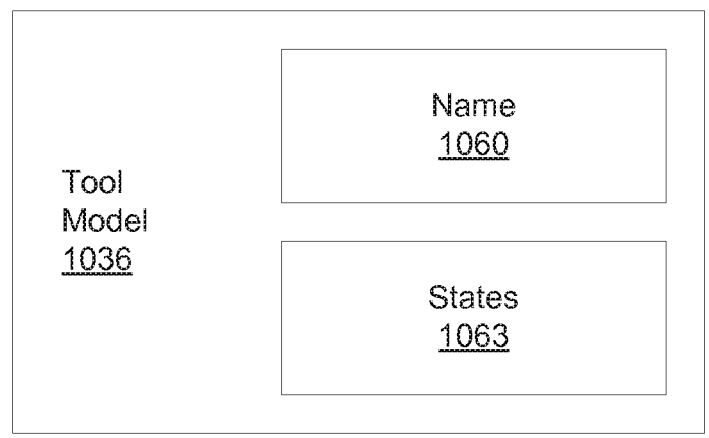

FIGS. 10A-10C illustrate various examples of simplified tool models according to some embodiments. In FIG. 10A, a tool model 1030 can include a name 1060 and a command description 1061 of the tool or tool module. Other description can be generated from the tool model 1030 to provide a more detailed tool model. In FIG. 10B, a tool model 1033 can include a name 1060 and an equipment description 1062 of the tool or tool module. Other description can be generated from the tool model 1033 to provide a more detailed tool model. In FIG. 10C, a tool model 1036 can include a name 1060 and a state description 1063 of the tool or tool module. Other description can be generated from the tool model 1036 to provide a more detailed tool model.

In some embodiments, minimum description for the tool model can be used. Additional description can be added if it is determined that the minimum tool model is not adequate. The minimum description of the tool model can be determined by a purpose of the tool model. For example, a minimum tool model designed for software generation can have the object codes for communicating and operating the various components of the tool, without the physical description of the components.

In some embodiments, the simplified tool model can be converted to a more detailed or more complete tool model. The conversion can include an incorporation of default components, components derived from the described components, or components generated to comply with certain rules or regulation. Other components can also be included in the conversion process, such as host communication, equipment communication and operation programs, etc.

In some embodiments, complete description for the tool model can be generated from the simplified tool model. The complete description of the tool model can be determined by a purpose of the tool model. For example, a complete tool model designed for a repair documentation can have information related to the installation and testing of the components, without the program components. Further, additional description can be provided, for example, during the generation of the output, e.g., the documentation of software of the tool that is the purpose of the tool model configuration.

The methods also can include using the derivations for the attribute during synthesis of the tool model representation of the tool. The determination of the derivations can include calling and executing a function that automatically generate default components, derived components or standard components. The attribute can be a component, a module, a state model, or a function of the tool, such that determining the derivations can include providing a tool model that conforms to certain requirements.

The methods further can include specifying a library to be accessed during compilation of the tool model representation of the tool. The library can include a database, a rule document, a template, or a standard related to the tool or the tool industry.

In some embodiments, the conversion process can include a generation of default components. For example, a simplified tool model of a rotation station can include a command to rotate a rotation motor to position 0. A conversion process can generate a communication establishing command or an initializing command, for example, from a controller to the motor, in addition to the command to rotate the motor. Further, sensing command to sense a change in status at the sensor of position 0, and a stopping command can be generated to complete the command of rotating the motor to position 0. Other default components can also be generated, such as a log command to log the progress and status of the rotation station; an alarm logging command to store any alarm generated during the rotating action; an error recovering command to process errors, such as alerting the operator if it is a serious error, ignoring the error or repeat the command if the error is minor or can be recoverable; or a fault clear command to clear any error. The default components can be predetermined and linked to the conversion process. The default components can be generated from a set of rules, linking an available component to various other components related to the available component. The generation of default components can require additional information, which can be provided in a library or a database format linked to the conversion process.

In some embodiments, the conversion process can include a generation of derived components, e.g., additional components derived from existing components. For example, a simplified tool model can include the physical hardware components and/or modules of the tool. A conversion process can generate other components derived from the tool hardware, such as commands, status, states, state models, or program codes. For example, a simplified tool model of a rotation station can include a rotating motor together with multiple sensors for detecting motor positions and detecting whether or not a substrate is present. The motor and the sensors can be used to derive command components. For example, a conversion process can generate commands to rotate the rotation motor to the positions detected by the position sensors, and command to detect the presence of a substrate. Other derived components can also be generated, such as the status of the rotation station, e.g., whether or not a substrate is present, or the location of the motor; the states of the rotation station, e.g., state 0-2 for positions 0, 90 or 180, state 3 and 4 for detecting and not detecting a substrate; state transitions from different states, and state models including states and state transitions; and software codes to operate the rotating motor or to read the sensors.

The derived components can be predetermined and linked to the conversion process. The derived components can be generated from a set of rules, linking an available component to various other components related to the available component. The generation of derived components can require additional information, which can be provided in a library or a database format linked to the conversion process.

FIG. 11 illustrates a generation of other description from a tool model according to some embodiments. In FIG. 11, a rotation station 1110 is shown, including a motor 1111, a reticle sensor 1112, and multiple position sensors 1113-1115. A tool model 1180 for the rotation station can include the name 1160 and a description of the commands 1161, including rotating commands, detecting reticle command, clear fault and stop commands. A precondition for the commands can be included, such as a requirement that the tool or the rotation station is enable before the commands can be performed. Another precondition can be a detection of reticle, which is required before rotating the motor. The tool model 1180 can be converted 1170 to a more detail tool model 1182, which can include additional descriptions such as state description 1163, equipment description 1164, status description 1165, and error description 1162.

The state description 1163 can include various states of the rotating motor, such as at position 0, at position 90, and at position 180. The state description can also include a state of whether or not a reticle is detected. These states can be derived from the command description 1161. For example, using the command of rotating to position 0, a state of at position 0 can be derived and added. Using a command of detecting a reticle, states of detecting or not detecting a reticle can be derived and added.

The equipment description 1164 can include various equipment of the rotation station, such as a rotating motor 811, a reticle sensor 812, multiple position sensors 813-815 at position 0, position 90, and position 180. This equipment can be derived from the command description 1161. For example, using the command of rotating to position 0, an equipment of a motor and an equipment of a sensor at position 0 can be derived and added. Using a command of detecting a reticle, an equipment of a reticle sensor can be derived and added.

The status description 1165 can include various status of the rotation station, such as whether or not a reticle is detected, whether or not the motor is at position 0, whether or not the motor is at position 90, whether or not the motor is at position 180, and whether or not the station is in error. These statuses can be derived from the command description 1161. For example, using the command of rotating to position 0, a status of whether or not the motor is at position 0, and a status of whether or not the system is in error can be derived and added. Using a command of detecting a reticle, a status of whether or not a reticle is present can be derived and added.

The error description 1162 can include various errors of the rotation station, such as whether or not the motor is in error, whether or not the sensor at position 0 is in error, whether or not the sensor at position 90 is in error, whether or not the sensor at position 180 is in error, whether or not the reticle sensor is in error, whether or not there is a connection error, whether or not there is an equipment error, whether or not there is an initialization error, and whether or not there is an unknown error. These errors can be derived from the command description 1161. For example, using the command of rotating to position 0, an error of whether or not the motor is in error, an error of whether or not the sensor at position 0 is in error, an error of whether or not there is a connection error, an error of whether or not there is an equipment error, an error of whether or not there is an initialization error, and an error of whether or not there is an unknown error can be derived and added.

FIG. 12 illustrates a generation of other description from a tool model according to some embodiments. In FIG. 12, a rotation station 1210 is shown, including a motor 1211, a reticle sensor 1212, and multiple position sensors 1213-1215. A tool model 1280 for the rotation station can include the name 1260 and a description of the equipment 1264, including a rotating motor 1211, a reticle sensor 1212, multiple position sensors 1213-1215 at position 0, position 90, and position 180.

The tool model 1280 can be converted 1270 to a more detail tool model 1282, which can include additional descriptions such as state description 1263, command description 1261, status description 1265, and error description 1262.

The state description 1263 can include various states of the rotating motor, such as at position 0, at position 90, and at position 180. The state description can also include a state of whether or not a reticle is detected. These states can be derived from the equipment description 1264. For example, using the motor and position sensor at position 0, a state of at position 0 can be derived and added. Using the reticle sensor, states of detecting or not detecting a reticle can be derived and added.

The command description 1261 can include various commands of the rotation station, such as rotating commands, detecting reticle command, clear fault and stop commands. A precondition for the commands can be included, such as a requirement that the tool or the rotation station is enable before the commands can be performed. Another precondition can be a detection of reticle, which is required before rotating the motor. These commands can be derived from the equipment description 1264. For example, using the motor and position sensor at position 0, a command of rotating to position 0 can be derived and added. Using the reticle sensor, a command of detecting a reticle can be derived and added.

The status description 1265 can include various status of the rotation station, such as whether or not a reticle is detected, whether or not the motor is at position 0, whether or not the motor is at position 90, whether or not the motor is at position 180, and whether or not the station is in error. These statuses can be derived from the equipment description 1264. For example, using the motor and position sensor at position 0, a status of whether or not the motor is at position 0, and a status of whether or not the system is in error can be derived and added. Using the reticle sensor, a command of detecting a reticle a status of whether or not a reticle is present can be derived and added.

The error description 1262 can include various errors of the rotation station, such as whether or not the motor is in error, whether or not the sensor at position 0 is in error, whether or not the sensor at position 90 is in error, whether or not the sensor at position 180 is in error, whether or not the reticle sensor is in error, whether or not there is a connection error, whether or not there is an equipment error, whether or not there is an initialization error, and whether or not there is an unknown error. These errors can be derived from the equipment description 1264. For example, using the motor and position sensor at position 0, an error of whether or not the motor is in error, an error of whether or not the sensor at position 0 is in error, an error of whether or not there is a connection error, an error of whether or not there is an equipment error, an error of whether or not there is an initialization error, and an error of whether or not there is an unknown error can be derived and added.

In some embodiments, the conversion process can include a generation of standard components, e.g., additional components required to satisfy rules, regulations or standards. For example, the conversion process can generate safety warning, for example, for high temperature heaters or for hazardous chemicals. The conversion process can also generate components required to satisfy a standardization of tool. For example, a standard for semiconductor equipment can include a host communication protocol, e.g., requirements that the semiconductor equipment has provisions for a remote host, which is managed by a facility system, to access the equipment computer and components, which are managed by the equipment vendor. The conversion process can generate standard requirements for a semiconductor equipment, such as alarm identifications, alarm types, alarm messages, and alarm recovery actions to satisfy the standard of exception management (e.g., Semi E41 standard); or data and events to be reported to the host, together with commands can be executed by the host to satisfy the standard of SECS/GEM (Semi Equipment Communications Standard/Generic Equipment Model, Semi E30 standard).

For example, a conversion process can generate standard components for a semiconductor equipment such as a reticle storage, such as data, event reporting, exceptions, or state models.

For example, a standard conversion process can generate host communication commands such as command identifier, command parameters, host event reporting such as command rejected, command about to send, command sent, etc. The standard conversion process can generate exception management such as connection problem, initialization problem, component problem, etc., each with an id number, message and recovery action. The standard conversion process can generate state models, which include states and state transitions for the tool. For example, a reticle storage equipment can have a reticle transfer state model, access state model, status of reticle pod state model, etc.

The standard components can be predetermined and linked to the conversion process. The standard components can be generated from a set of rules, for example, which are converted from a standard document related to the tool. The generation of standard components can require additional information, which can be provided in a library or a database format linked to the conversion process.

Figure 13:
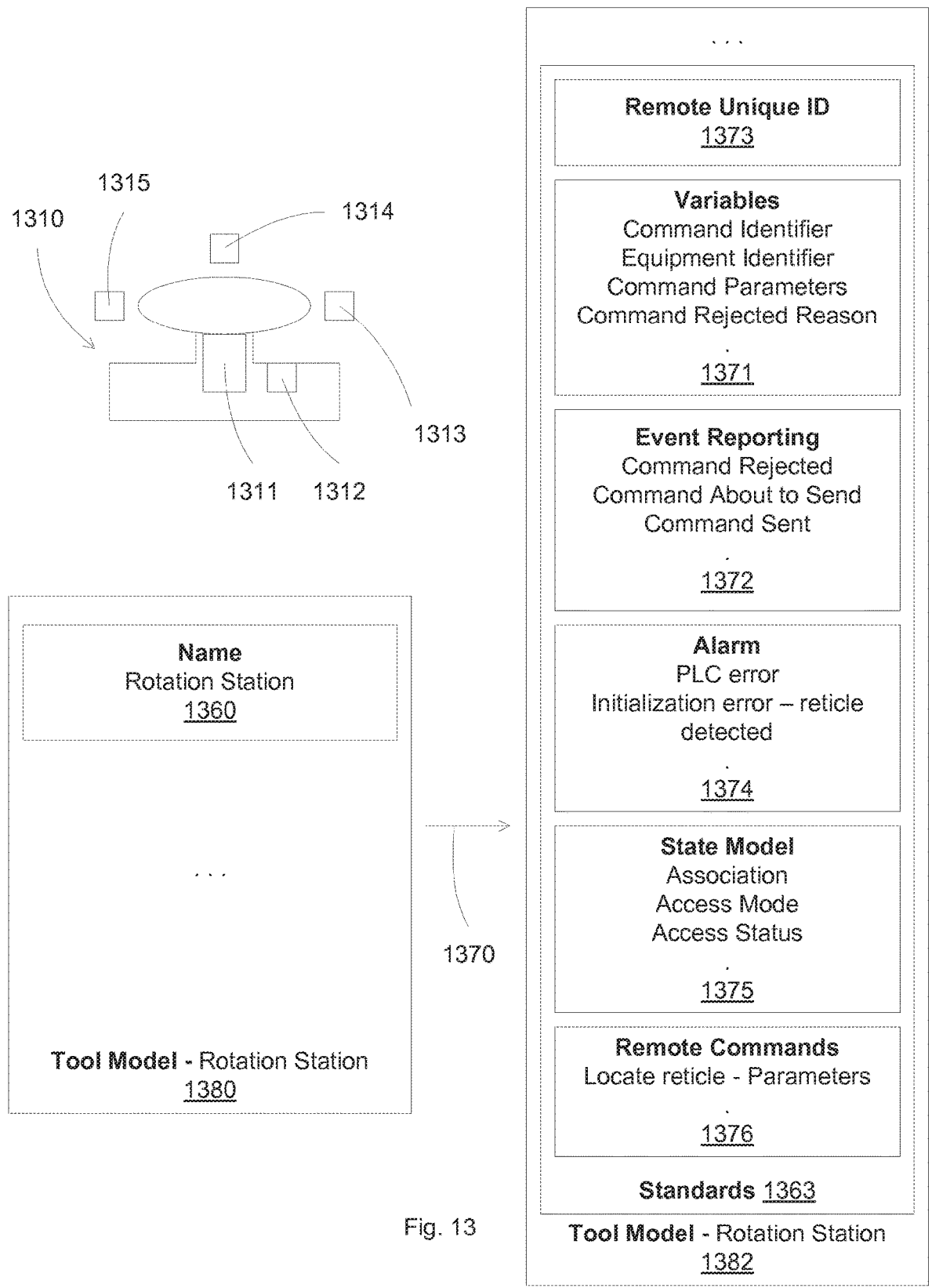
FIG. 13 illustrates a generation of a standard description from a tool model according to some embodiments.

FIG. 13 illustrates a generation of a standard description from a tool model according to some embodiments. In FIG. 13, a rotation station 1310 is shown, including a motor 1311, a reticle sensor 1312, and multiple position sensors 1313-1315. A tool model 1380 for the rotation station can include the name 1360 and other descriptions.

The tool model 1380 can be converted 1370 to a more detail tool model 1382, which can include additional descriptions to satisfy a standard requirement 1363, such as a semi standard for semiconductor equipment. The standard description can include remote unique ID 1373, variables 1371, event reporting 1372, alarm 1374, state models 1375, and remote commands 1376. The standard description can be derived from the semiconductor standards for semiconductor equipment, such as standard E30 for host communication, standard E41 for exception management, and standard E109 for reticle management.

The remote unique ID 1373 can be generated from a counter, to provide unique identification for certain events. The variable description can include the data that can be polled by a host to know the status and states of the tool. The variables can include a command identifier which can identify the executed command, an equipment identifier which can identify the tool, command parameters which are provided to the command, a command rejected reason which identifies the reason that a command is not executed. Other variables can be added.

The event reporting 1371 can include an event of command rejected which reports that the command has been rejected, an event of command about to send which reports that the command is about to send, an event of command sent which reports that command has been sent. Other events can be included for reporting.

The alarms 1374 can include a PLC (programmable logic controller) alarm which notifies that there is an error with the PLC controller, an initialization alarm which notifies that a reticle is detected in the stocker and thus the stocker cannot be initialized. Other alarms can be included.

The state models 1375 can include an association state model which defines a host view of the pod to reticle load port, an access mode state model which defines a host view of the equipment access mode, an access status model which defines a host view of the reticle pod. Other state models can be included, such as reticle transfer state model, reticle ID status state model, or pod slot map status state model.

The remote commands 1376 can include the commands that a host system can provide to the tool. The remote commands can include a command of locate a reticle, with associated parameters such as the reticle ID. Other remote commands can be included, such as locate a pod.

Figure 14:
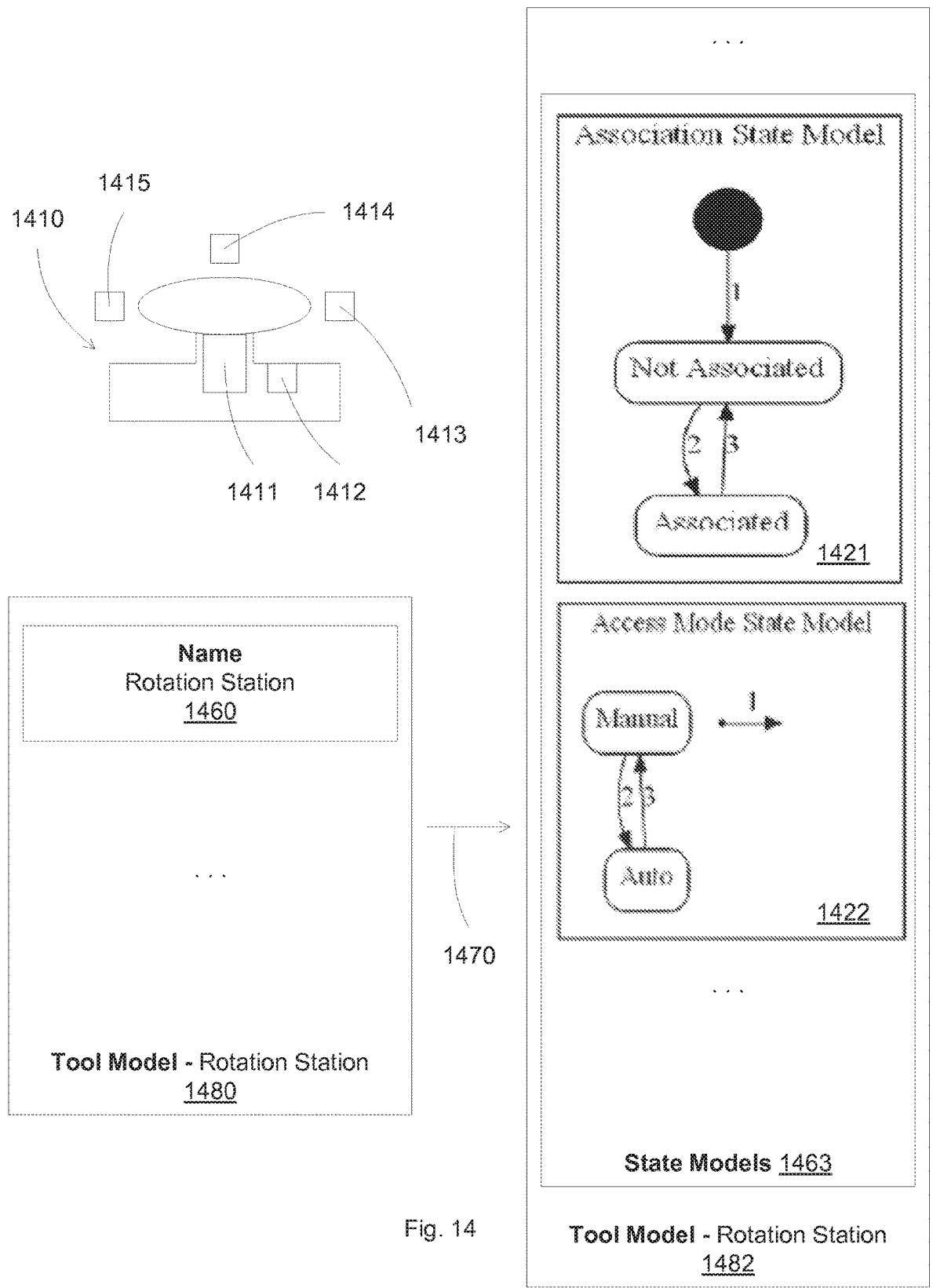
FIG. 14 illustrates a generation of state models from a tool model according to some embodiments.

FIG. 14 illustrates a generation of state models from a tool model according to some embodiments. In FIG. 14, a rotation station 1410 is shown, including a motor 1411, a reticle sensor 1412, and multiple position sensors 1413-1415. A tool model 1480 for the rotation station can include the name 1460 and other descriptions.

The tool model 1480 can be converted 1470 to a more detail tool model 1482, which can include additional descriptions to satisfy a standard requirement. The standard description can include the state models 1463.

The state models 1463 can include an association state model 1421 which defines a host view of the pod to reticle load port. The associate state model can include a not associated state, which specifies that there is no pod association present for the load port. The associate state model can include an associated state, which specifies that a pod id has been associated with the reticle load port. Therefore the load port is not available for new load port association. The association state model can include different transitions between the states, for example, a transition #1, defining a system reset transition, a transition #2 from the non-associated state to the associated state, defining that the pod id has been associated with the reticle load port, and a transition #3 from the associated state to the non-associated state, defining that an association has been canceled.

The state models 1463 can include an access mode state model 1422 which defines a host view of the equipment access mode, together with the host interaction with the equipment to switch the access mode. The access mode state model can include a manual state, which specifies that only manual pod transfers are allowed, and an auto state, which specifies that automatic pod transfers are allowed. The access mode state model can include transitions between the states, for example, a transition #1, defining a system reset transition, a transition #2 from the manual state to the auto state, defining that a change access service to auto has been executed, and a transition $3 from the auto state to the manual state, defining that a change access service to manual has been executed.

FIGS. 15A-15E illustrate flow charts for generating a tool model according to some embodiments. In FIG. 15A, operation 1510 provides that a person makes a file containing a tool model, wherein the tool model includes a text, figure, symbol, or program description of the tool.

In FIG. 15B, operation 1520 provides that a person fills a template to make a file containing a tool model, wherein the tool model includes a text, figure, symbol, or program description of the tool.

In FIG. 15C, operation 1530 provides that a person fills a template to make a file containing a tool model, wherein the tool model includes a text, figure, symbol, or program description of the tool, and wherein the template is interactive with auto generation of data and prompts based on inputs.

In FIG. 15D, operation 1540 provides that a program is run, using a simplified tool model as an input, to make a file containing a more detailed tool model, wherein the tool model includes a text, figure, symbol, or program description of the tool.

In FIG. 15E, operation 1550 provides that a program is run, using a simplified tool model as an input, to make a file containing a more detailed tool model, wherein the tool model includes a text, figure, symbol, or program description of the tool, and wherein the template is interactive with auto generation of data and prompts based on inputs.

Figure 16A:
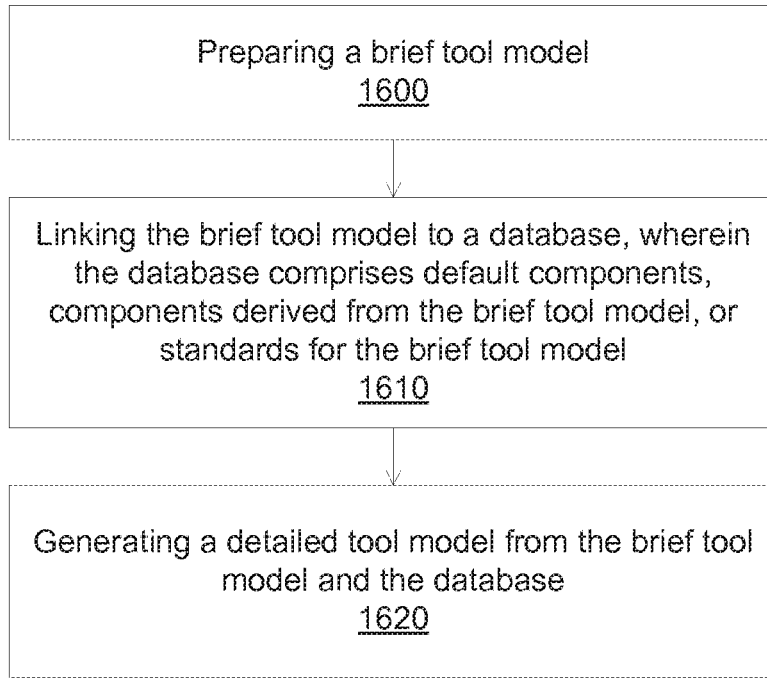
FIGS. 16A-16B illustrate flow charts for generating a tool model according to some embodiments.
Figure 16B:
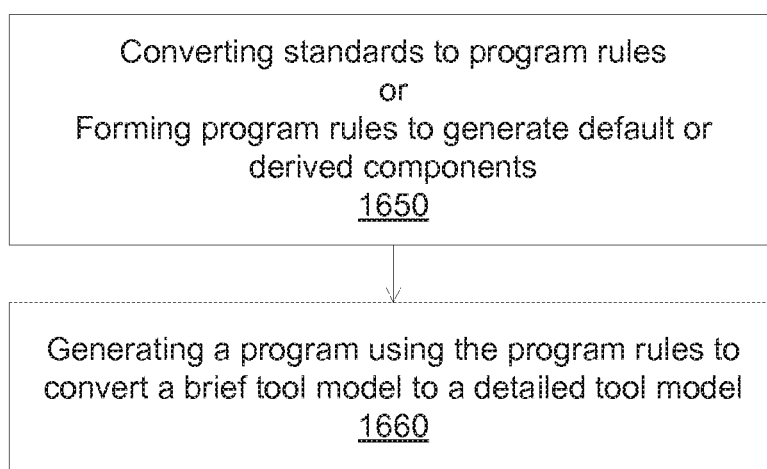

FIGS. 16A-16B illustrate flow charts for generating a tool model according to some embodiments. In FIG. 16A, operation 1600 prepared a simplified tool model. Operation 1610 links the simplified tool model to a database, wherein the database includes default components, components derived from the brief tool model, or standards for the simplified tool model. Operation 1620 generates a more detailed tool model from the simplified tool model and the database.

In FIG. 16B, operation 1650 converts a standard to program rules, or forms program rules to generate default of derived components. Operation 1660 generates a program using the program rules to convert a simplified tool model to a mode detailed tool model.

In some embodiments, systems and methods are provided for a template for the generation of more detailed tool models, for example, from a tool model input. A files containing the default components, the derived components, the standard components, and other components can be created to assist in the generation of a more detailed tool model. For example, the rules generated for generating default components, derived components, standard components, and other components can be incorporated into a library or a template.

In some embodiments, the template can be linked by a program to generate the detailed tool model. For example, a SECS/GEM template can include the rules for generate host communication, together with specific commands and protocols. An exception management template can include the rules for generating alarm related commands and information, such as alarm id, alarm type, alarm message, or alarm recovering action. Standard for reticle management can be used for reticle related equipment, and can include the rules for generating states, state transitions, and state models for reticle activities. Other templates can be used for safety regulations, for generating default components, or for generating derived components.

In some embodiments, the template can be linked by an interactive dialog to generate the detailed tool model. For example, after a user enters a tool component, the interactive dialog can generate possible host communication commands, possible alarm conditions, and possible state models. The generated components can be automatically accepted, or the user can select appropriate components to be included in the detailed tool model. In addition, the interactive dialog can prompt the user for additional information, for example, to complete the generation of default, derived or standard components. For example, the dialog can ask if exception management standard is processed, or if host communication should be included.

In some embodiments, provided are systems and methods for converting a tool model into a user defined functionality, such as a tool documentation or a tool software program. The methods can include translating an equipment or tool or into a user defined functionality, such as a tool documentation or a tool software program.

In some embodiments, provided is a conversion of a tool model representation, which is a hardware description of a tool, to a user-defined functionality, such as a detailed tool model, a documentation of the tool, or a software for the tool.

In some embodiments, provided is a tool compiler for converting or translating a hardware description tool model representation to a user-defined functionality. In some embodiments, the methods can involve the conversion of at least one section of a tool, represented by a tool model, to a user defined functionality using a tool compiler, which can carry the methods. For the purposes of this invention, a "section" of a tool refers to a component, a module, or a collection of elements of a tool.

In some embodiments, the methods can be performed by a tool compiler, or a computer program, programmed to perform the steps of the method. In addition, the compiler may be capable of accepting user-defined constraints within which to execute the method of the present invention. Such constraints, and the processes of passing the constraints to the compiler, can include adding default components, adding components derived from the available components, or adding components that are needed to satisfy a tool regulation.

In some embodiments, systems and methods are provided for generating a documentation of a tool based on a tool model input. The documentation can be a user manual, a software operation manual, a service manual, a maintenance manual, a repair manual, or any other types of documentation. The tool model can be a generic tool model, having description of components of the tool to allow the generation of a document. The tool model can be a specific tool model, having description of components of the tool to allow the generation of a specific document. For example, a tool model having command description can be used to generate software operation manual. A tool model having detailed description of physical hardware components can be used to generate repair manual. A tool model having description of system or component reliability can be used to generate maintenance manual.

In some embodiments, the tool model can include adequate description to allow the generation of a document. For example, to generate a user manual which is conformed to semiconductor standards, a tool model having SECS/GEM components, exception management components, and state model components can be used to generate the document.

In some embodiments, the tool model can include provisions to generate needed description to allow the generation of a document. For example, to generate a user manual which is conformed to semiconductor standards, a tool model, after determining that the standard components are not included, can access standard templates to gather SECS/

GEM components, exception management components, and state model components before continue with the generation of the document.

Figure 17:
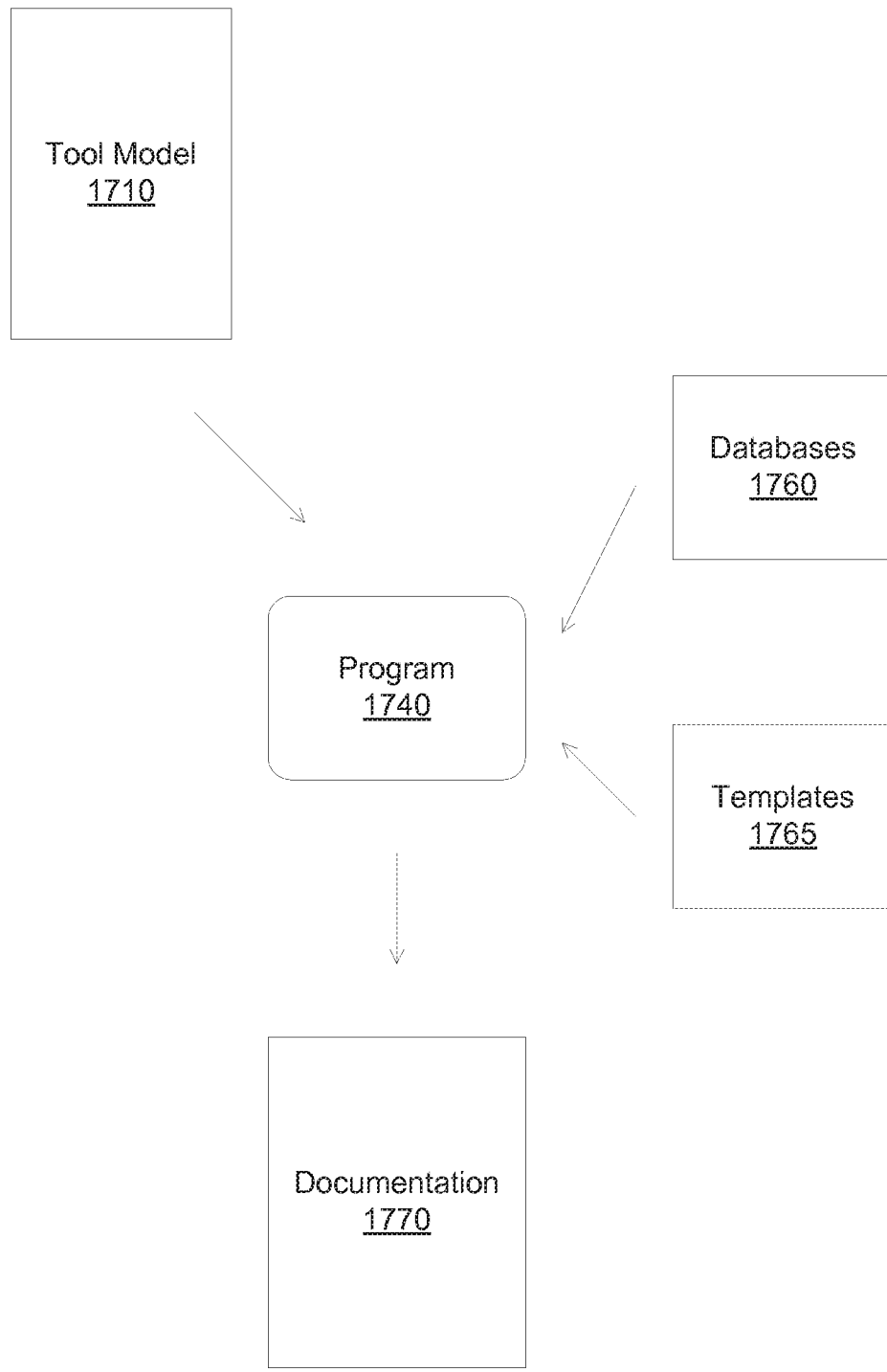
FIG. 17 illustrates a schematic for generating a document from a tool model according to some embodiments.

FIG. 17 illustrates a schematic for generating a document from a tool model according to some embodiments. A tool model 1710 can be translated or converted, for example, by a software program or a tool compiler 1740, to produce a documentation 1770, such as user manual, software manual, service manual, maintenance manual, repair manual, or other types of manual. Different databases 1760 can be incorporated into the program 1740 to provide default components, derived components, standard components, or other additional components for the tool model. In addition, templates 1765, such as document format or style templates, can be used to provide a desired format or style to the documentation 1770.

Figure 18:
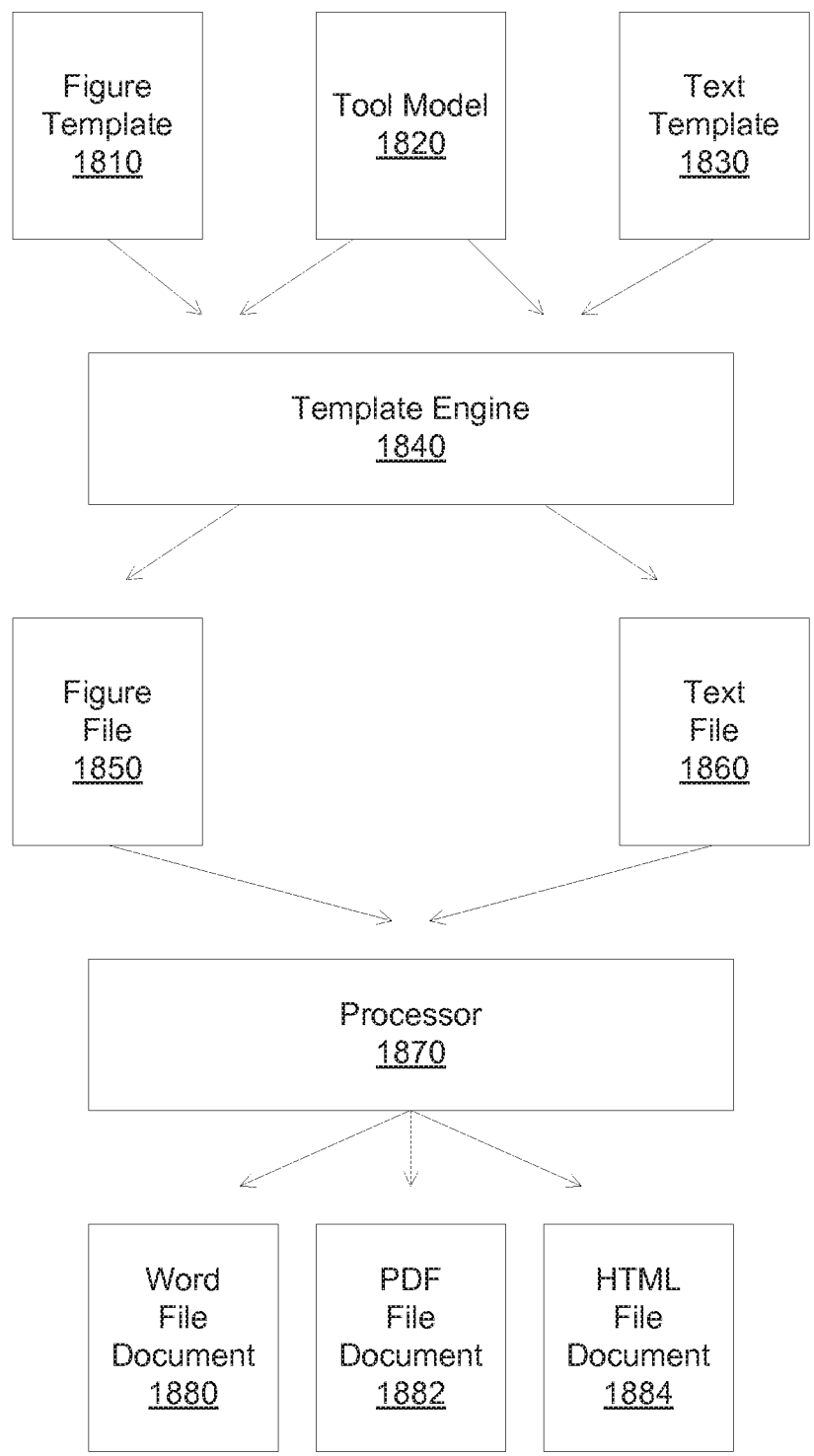
FIG. 18 illustrates another schematic for generating a document from a tool model according to some embodiments.

FIG. 18 illustrates another schematic for generating a document from a tool model according to some embodiments. A tool model 1820, together with a figure template 1810 and a text template 1830 can be provided to a template engine 1840, which can be a software program, to produce separate text file 1860 and figure file 1850. The text and figure files 1860 and 1850 can be provided to a processor 1870 to produce a document, for example, in Microsoft Word format 1880, Adobe Portable Document Format (pdf) 1882, or Hypertext markup language (html) format 1884.

In some embodiments, the documentation generation process can include linking to a formatting template to provide a document with a desired format. For example, a formatting template can include instruction regarding the appearance of the document on paper, such as font type, font size, paragraph spacing, bold type for headings, etc. The formatting template can include style templates to provide a style to the document. The formatting template can include pictorial templates to manage the figures in the document. The formatting template can include international templates, such as i18n files, to provide the document to various languages. The formatting template can include other templates, such as specific or custom templates to serve a specific audience.

In some embodiments, the documentation generation process can include creating a text template, such as a docbook template, and an image template, such as a dot template. The tool model, together with the docbook and dot template, can be inputted to a template engine, to generate a docbook document, containing the textual information of the tool model in the docbook format, and to generate a dot document, which can be further processed to generate a dot file containing the image information of the tool model. The docbook document and the dot file can be inputted to a processor, together with optional style sheet template, to form the final document.

Figure 19:
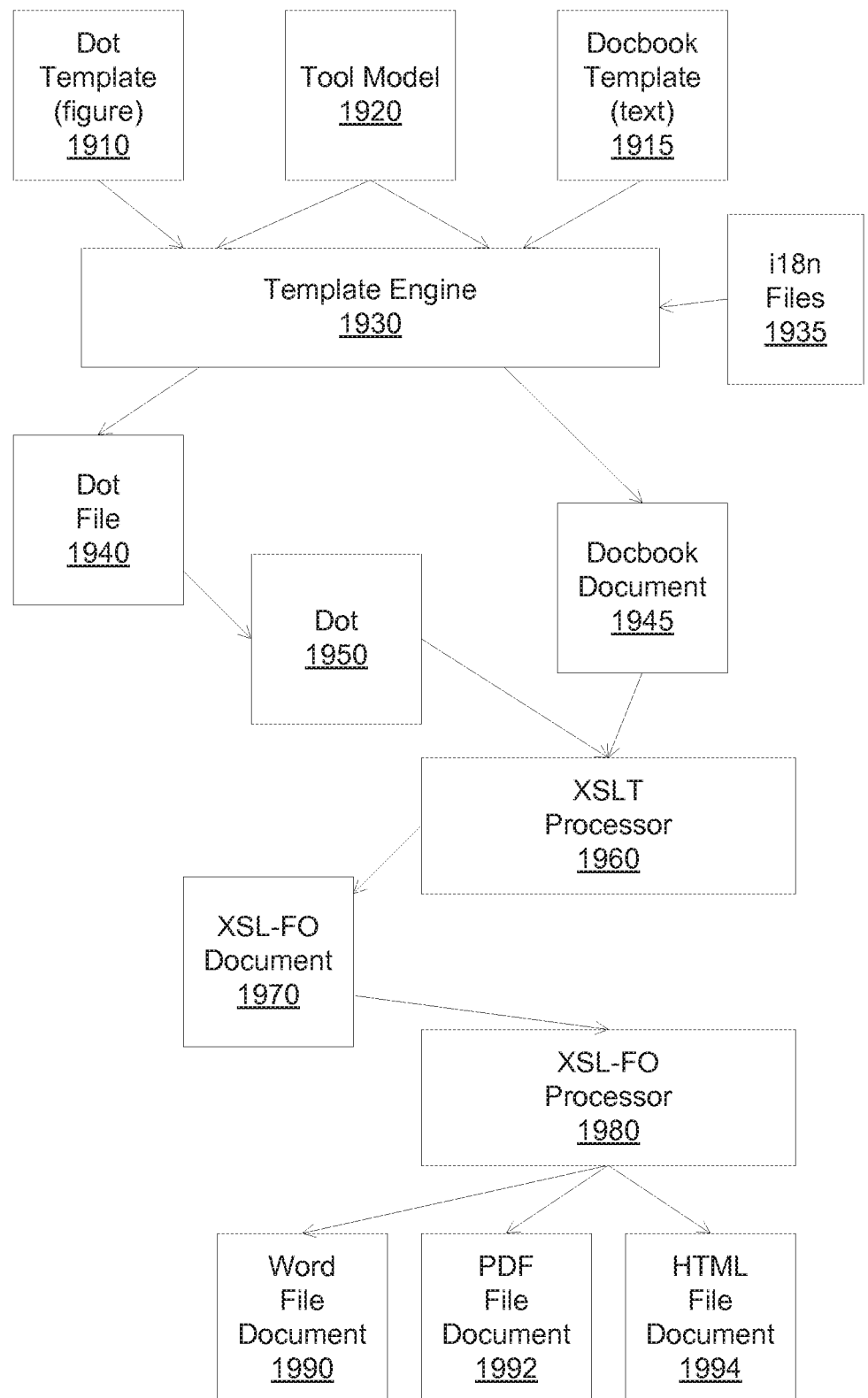
FIG. 19 illustrates another schematic for generating a document from a tool model according to some embodiments.

FIG. 19 illustrates another schematic for generating a document from a tool model according to some embodiments. A tool model 1920, together with a dot template for FIG. 1910 and a docbook template for text 1915 can be provided to a template engine 1930, which can be a software program, to produce separate docbook text document 1945 and dot figure file 1940. International templates 1935, such as i18n files, can be provided to the template engine 1930 to produce docbook and dot files with different languages. The dot figure file 1940 can be process by a dot program 1950, and then provided to a XSLT processor 1960, together with the docbook document 1945. The XSLT processor 1960 can produce a XSL-FO document 1970, which can be provided to a XSL-FO processor 1980 to produce a document, for example, in Microsoft Word format 1990, Adobe Portable Document Format (pdf) 1992, or Hypertext markup language (html) format 1994.

Figure 20:
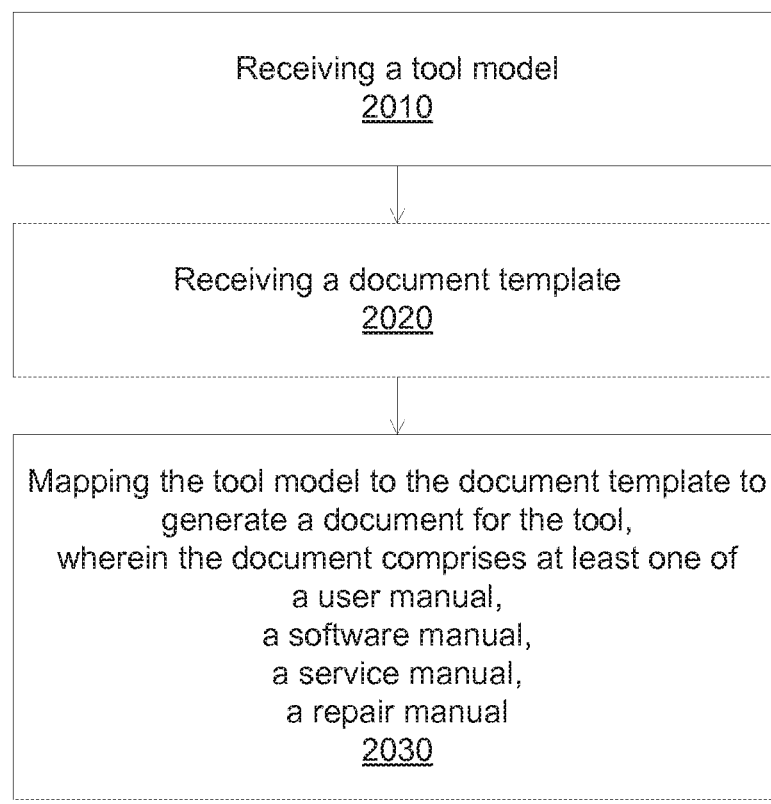
FIG. 20 illustrates a flow chart for generating a documentation from a tool model according to some embodiments.

FIG. 20 illustrates a flow chart for generating a documentation from a tool model according to some embodiments. Operation 2010 receives a tool model. Operation 2020 receives a document template. Operation 2030 maps the tool model to the document template to generate a document for the tool, wherein the document comprises at least one of a user manual, a software manual, a service manual, and a repair manual.

In some embodiments, systems and methods are provided for generating a software program of a tool based on a tool model input. The software program can be an operating software, a built software, a servicing software, a reliability testing software, a diagnostic software, or any other software programs. The tool model can include software components, such as object codes or source codes to allow accessing the hardware components, together with possible commands for operate the hardware modules.

In some embodiments, the tool model can have a link to an object code or source code file, which can contain running software for the commands, components or modules of the tool. For example, a tool model can have a motor component, and a link to a file containing the commands to run the motor, to stop the motor, or to set parameters for the motor. The tool model can have a sensor, and a link to a file containing the commands to read from the sensor. The tool model can have a robot handler, and a link to a file containing the commands to. run the robot, such as to rotate the robot, to extend or retract the robot arm, or to set parameters for the robot, such as setting the speed or acceleration of the robot.

In some embodiments, the software generation process can include linking to a formatting template to provide a software program with a desired functionality. For example, a formatting template can include graphic pages regarding the appearance of the program on a monitor screen, such as font type, font size, paragraph spacing, bold type, etc. The formatting template can include pictorial templates to manage the figures in the display. The formatting template can include place-holder commands to provide the actions performed by the software program. The formatting template can include international templates, such as i18n files, to provide the appearance, the instruction, or the messages in various languages. The formatting template can include other templates, such as specific or custom templates to serve a specific audience.

In some embodiments, the software generation process can include replacing place-holder commands of the software template with the commands from the tool model. The software template can be customized with the commands from the tool model, and thus can be used specifically for the purposes of the tool model.

In some embodiments, systems and methods are provided for generating an operating software program of a tool based on a tool model input. The operating software program can be used to operate the tool, collecting data and reporting to a host system. For example, an operating software for a reticle storage can be used to transfer reticles from a load lock to a storage chamber, to retrieve reticles from the storage chamber to the load lock, to provide an inventory of reticles in the storage chamber, to count the empty, e.g., available spaces, or in the storage chamber for storing additional reticles. The operating software can contain host communication, for example, which conforms to SECS/GEM standard for semiconductor equipment, to allow a host computer of the facility to communicate with the tool, for example, to retrieve states of the tool, to issue remote commands to the tool, or to receive status of the tool related to the issued commands or to other aspects of the tool.

In some embodiments, the tool model can be mapped to the software template, for example, by replacing place-holder commands, graphic elements, input and output files of the software template with the corresponding elements from the tool model. An operating software can be generated, with the format of the software template, and the commands and instructions from the tool model.

Figure 21:
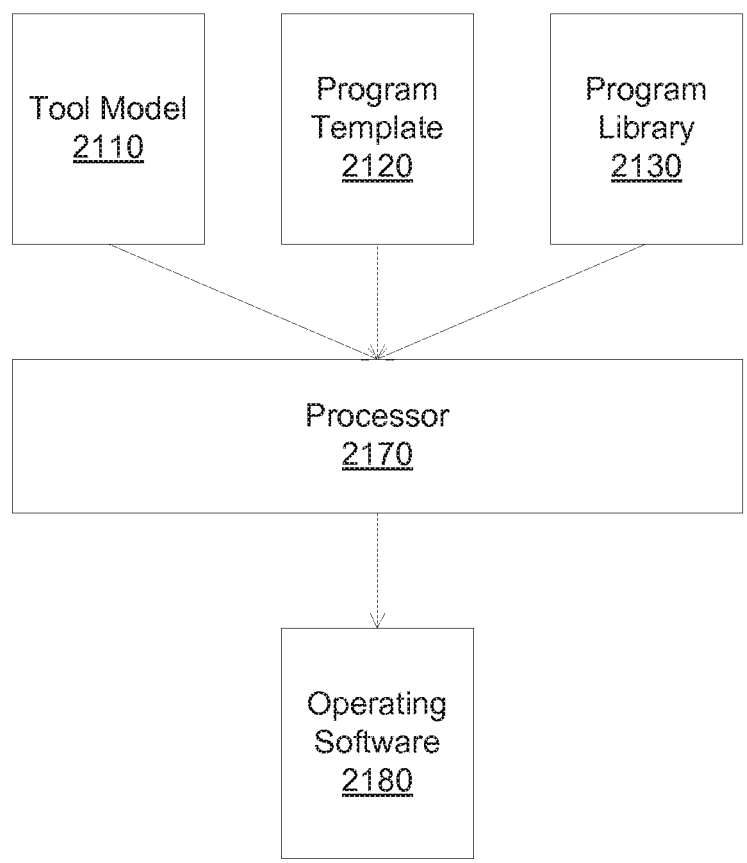
FIG. 21 illustrates a schematic for generating an operating software from a tool model according to some embodiments.

FIG. 21 illustrates a schematic for generating an operating software from a tool model according to some embodiments. A tool model 2110, together with a software template 2120 and a library program 2130 can be provided to a software program or a tool compiler 2170, to produce an operating software program 2180. The software template 2120 can provide a framework for the operating software 2180, with the specific graphics and commands of the template are replaced by the data from the tool model. The library program 2130 can provide additional information for the production of the software program, such as default components, derived components, standard components, or other additional components.

Figure 22:
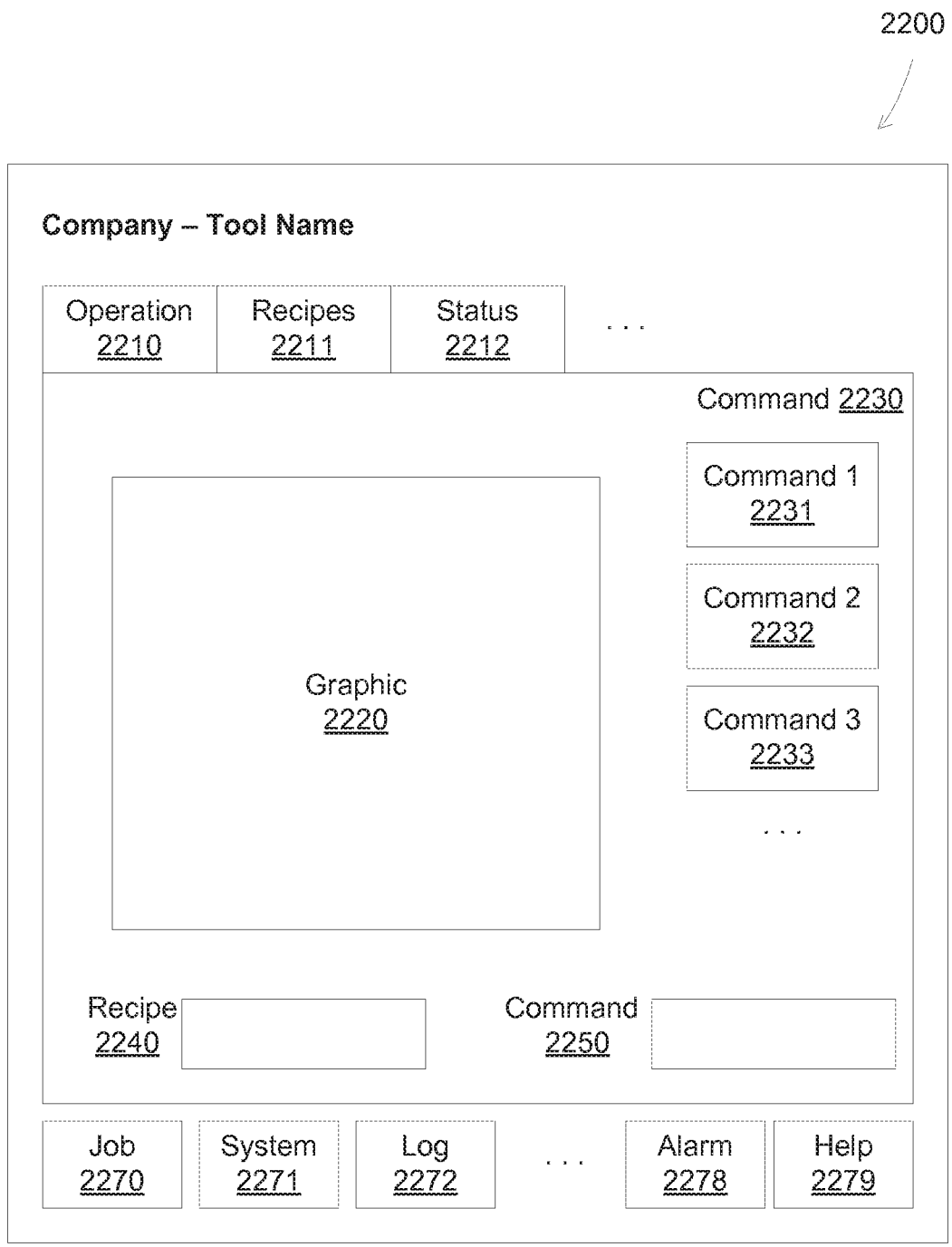
FIG. 22 illustrates an example of a software template for an operating software according to some embodiments.

FIG. 22 illustrates an example of a software template for an operating software according to some embodiments. The software template 2200 can include a framework of the operating software, together with place-holder commands and information. For example, the template can include the place holder information of company and tool name, which can be replaced by specific data from the tool model. The template can include place holder commands, such as a collection of commands 2230, specific commands 2231-2233, which can be replaced by specific data from the tool model. The template can include place holder graphic 2220, which can be replaced by specific data from the tool model. The template can include an operating software framework, such as having multiple pages of operation 2210, recipes 2211, and status 2212, together with multiple buttons for switching between aspects of the tool, such as job 2270, system 2271, log 2272, alarm 2278, and help 2279. The template can include fields for entering or selecting data, such as recipe selection 2240 or command selection 2250.

Figure 23:
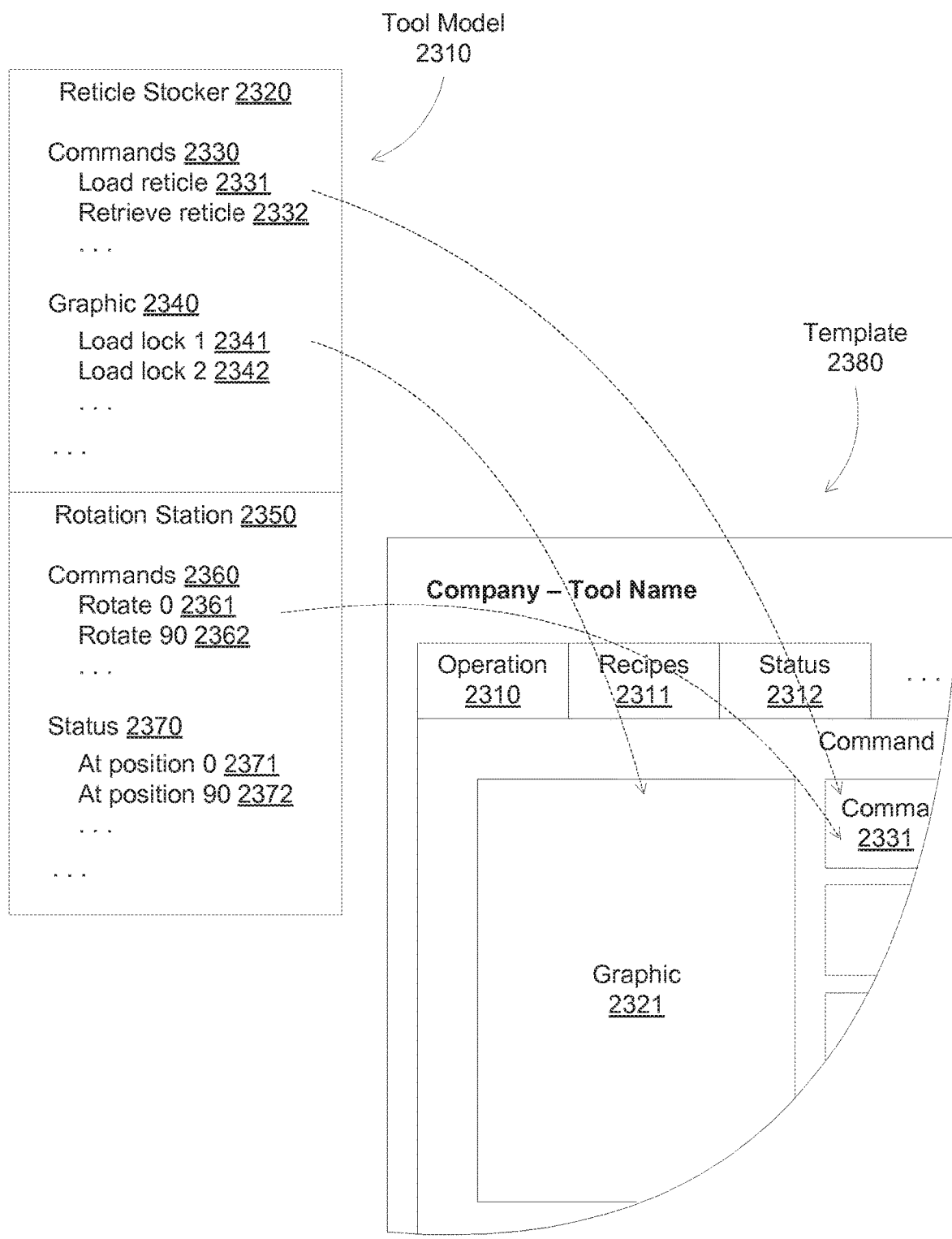
FIG. 23 illustrates an example of a mapping operation between a tool model and a software template according to some embodiments.

FIG. 23 illustrates an example of a mapping operation between a tool model and a software template according to some embodiments. A tool model 2310 representing a reticle stocker 2320 can be used to produce specific data and information for an operating software template 2380. The tool model 2310 can include tool description for commands 2330, such as load reticle 2331 and retrieve reticle 2332, and graphic description 2340, such as load lock 1 2341 and load lock 2 2342. The tool model 2310 can include tool description for the modules of the tool, such as a rotation station module 2350, which can include description for commands 2360 such as rotating to position 0 2361 and rotating to position 90 2362, and description for status 2370, such as reticle at position 0 2371 and reticle at position 90 2372.

The commands 2330 and 2360 can be mapped to the command section 2331 of the software template 2380, replacing the place-holder commands of the template with the specific commands from the tool model. Similarly, the graphic 2340 can be mapped to the graphic section 2321 of the software template 2380, replacing the place-holder graphic commands of the template with the specific graphic from the tool model. Other generic sections of the template can remain unchanged, such as the operation section 2310, the recipe section 2311, and the status section 2312.

In some embodiments, systems and methods are provided for generating a test software program of a tool based on a tool model input. The test software program can be used to test the tool and its modules and components, even before the complete construction of the tool. For example, a test software for a reticle storage can be used to test the individual modules, such as the load lock modules, the rotation station, the robot module, the storage module, or the support module, as soon as the modules are built. Further the test software can test the connection between built modules. Component, module and system reliability can be evaluated, for example, by repeating a test procedure or sequence. In addition, provision for custom sequences can be provided, allowing a customer to design and test any particular sequences.

In some embodiments, the tool model can be mapped to the software template, for example, by replacing place-holder commands, graphic elements, input and output files of the software template with the corresponding elements from the tool model. A test software can be generated, with the format of the software template, and the commands and instructions from the tool model.

Figure 24:
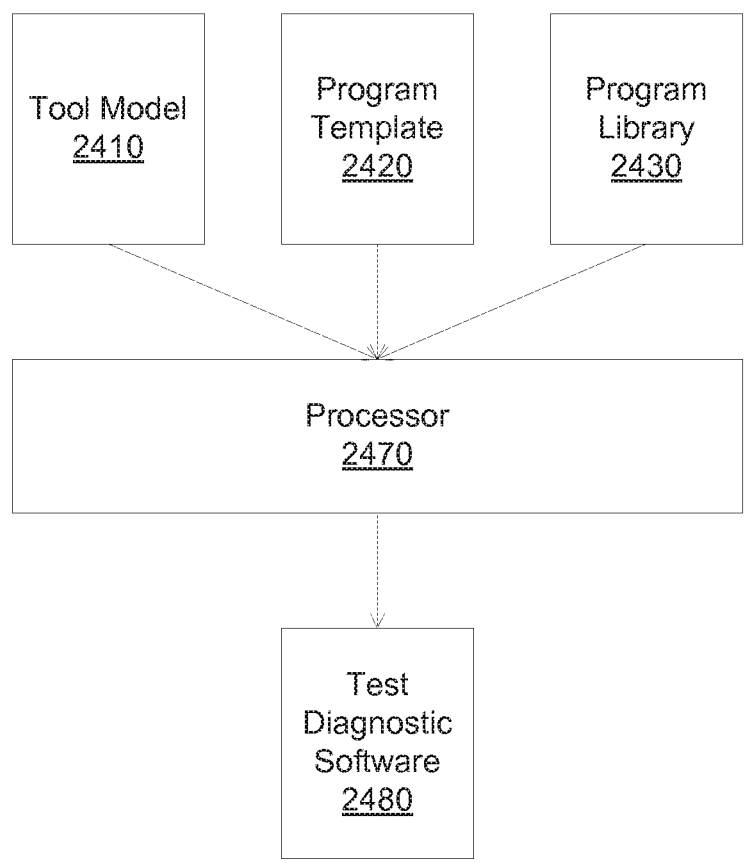
FIG. 24 illustrates a schematic for generating a test or diagnostic software from a tool model according to some embodiments.

FIG. 24 illustrates a schematic for generating a test or diagnostic software from a tool model according to some embodiments. A tool model 2410, together with a software template 2420 and a library program 2430 can be provided to a software program or a tool compiler 2470, to produce a test or diagnostic software program 2480. The software template 2420 can provide a framework for the test or diagnostic software 2480, with the specific graphics and commands of the template are replaced by the data from the tool model. The library program 2430 can provide additional information for the production of the software program, such as default components, derived components, standard components, or other additional components.

Figure 25:
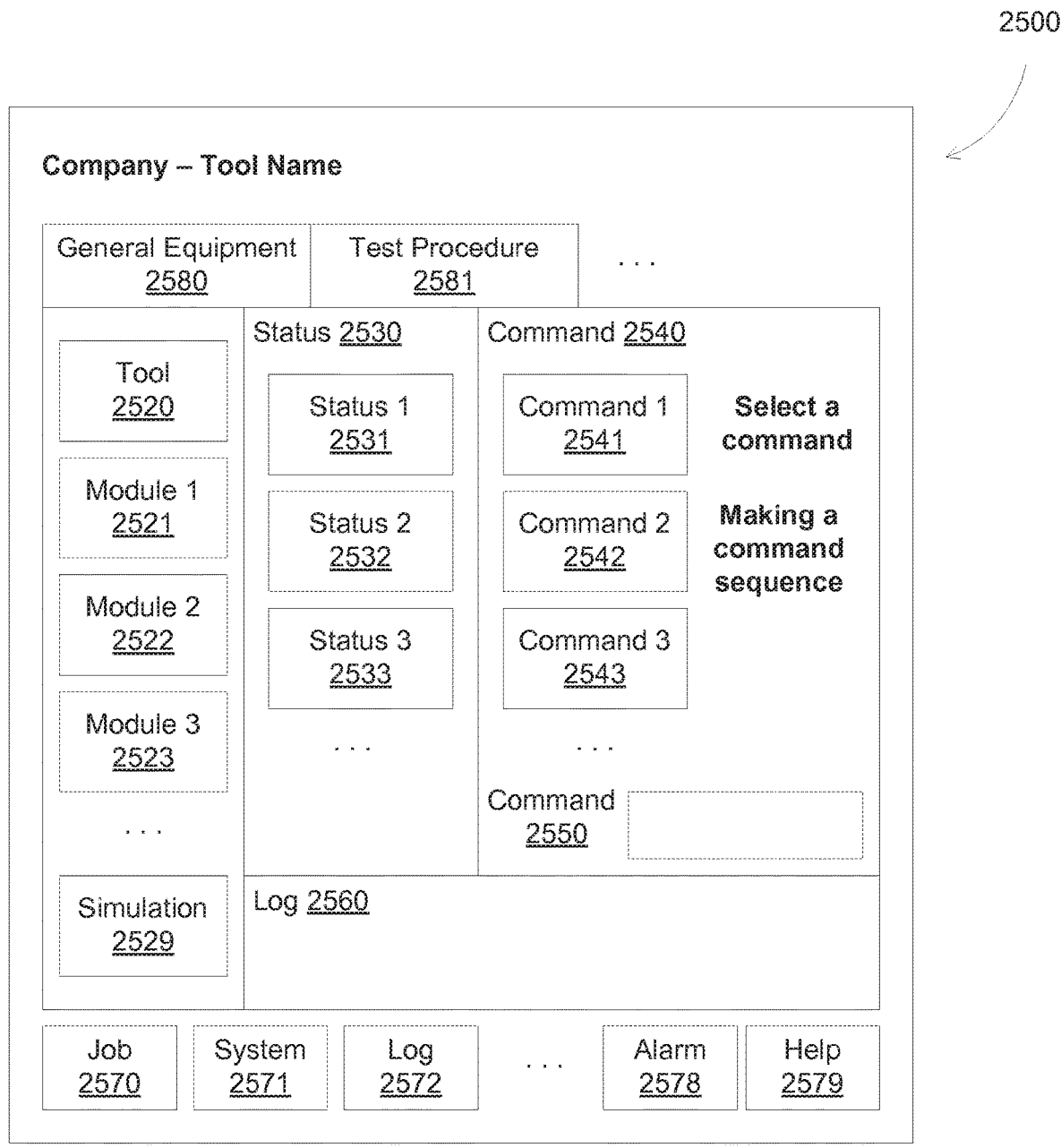
FIG. 25 illustrates an example of a software template for a test or diagnostic software according to some embodiments.

FIG. 25 illustrates an example of a software template for a test or diagnostic software according to some embodiments. The software template 2500 can include a framework of the test or diagnostic software, together with place-holder commands and information. For example, the template can include the place holder information of company and tool name, which can be replaced by specific data from the tool model. The template can include place holder commands, such as a collection of commands 2540, specific commands 2541-2543, which can be replaced by specific data from the tool model. The template can include place holder status 2530, such as status 1-3 2531-2533, modules 2520-2529, which can be replaced by specific data from the tool model. The template can include a test or diagnostic software framework, such as having multiple pages of operation general equipment 2580, and test procedure 2581, together with multiple buttons for switching between aspects of the tool, such as job 2570, system 2571, log 2572, alarm 2578, and help 2579. The template can include fields for entering or selecting data, such as command selection 2550. The template can include fields for reporting data, such as log selection 2560. The template can allow selecting a command, or forming a new command sequence for testing. The new sequence can be saved for future used. Parallel sequences can be formed.

Figure 26:
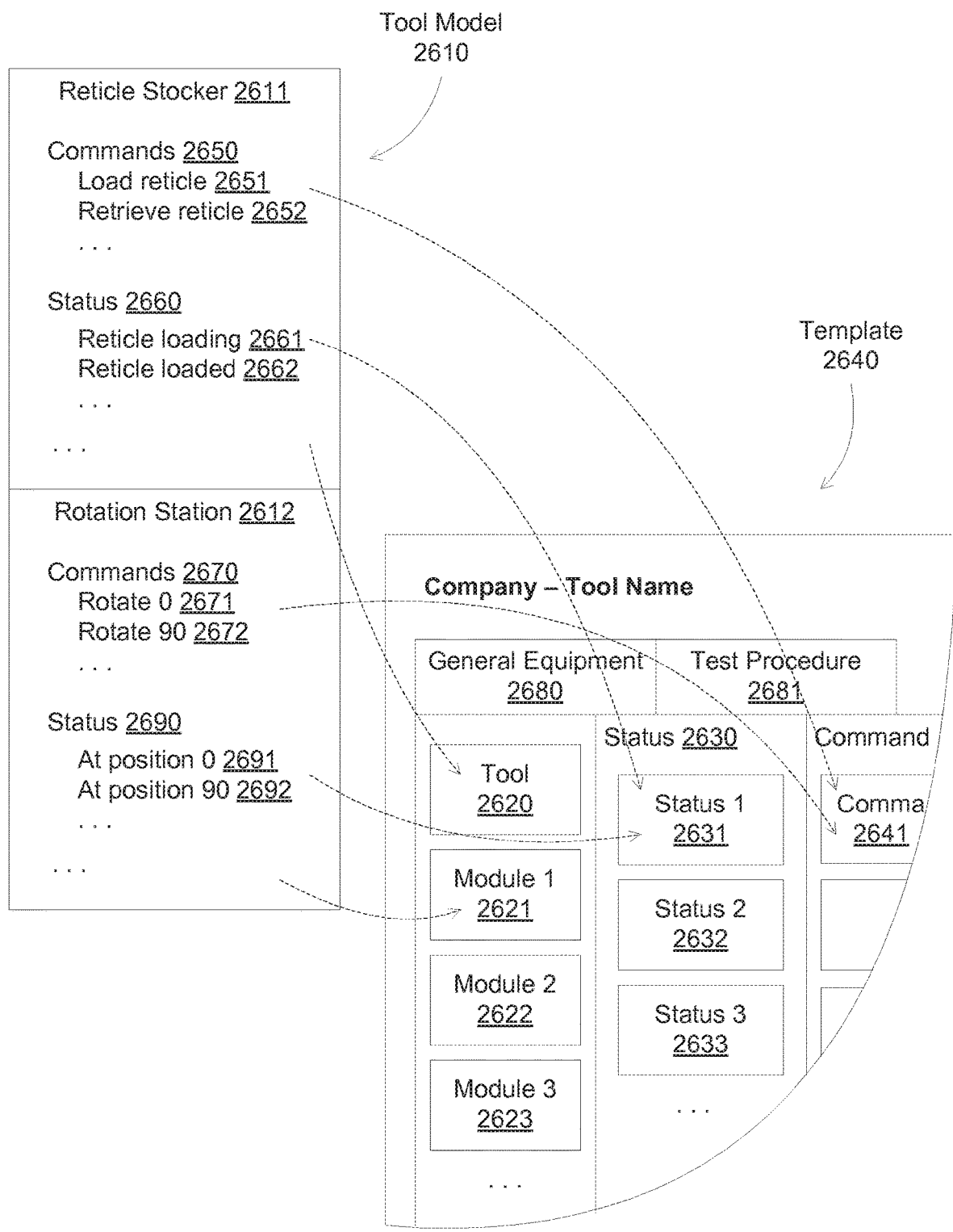
FIG. 26 illustrates an example of a mapping operation between a tool model and a software template according to some embodiments.

FIG. 26 illustrates an example of a mapping operation between a tool model and a software template according to some embodiments. A tool model 2610 representing a reticle stocker 2611 can be used to produce specific data and information for an operating software template 2640. The tool model 2610 can include tool description for commands 2650, such as load reticle 2651 and retrieve reticle 2652, and status description 2660, such as reticle loading status 2661 and reticle loaded status 2662. The tool model 2610 can include tool description for the modules of the tool, such as a rotation station module 2612, which can include description for commands 2670 such as rotating to position 0 2671 and rotating to position 90 2672, and description for status 2690, such as reticle at position 0 2691 and reticle at position 90 2692.

The commands 2650 and 2670 can be mapped to the command section 2641 of the software template, replacing the place-holder commands of the template with the specific commands from the tool model. Similarly, the status 2660 and 2690 can be mapped to the status section 2630-2633 of the software template 2640, replacing the place-holder status report of the template with the specific graphic from the tool model. Also, the modules 2611 and 2612 can be mapped to the module section 2620-2623 of the software template 2640, replacing the place-holder modules of the template with the specific module information from the tool model. Other generic sections of the template can remain unchanged, such as the general equipment section 2680, and the test procedure section 2681.

FIG. 27 illustrates a flow chart for generating a software template according to some embodiments. Operation 2700 defines the functions of a software program, such as an operating software or a test software. Operation 2710 generates a software program template to perform the functions, wherein the software program comprises place-holder commands, wherein the software program comprise command structures, wherein the software program comprises a graphical interface, wherein the software program comprise default functions.

Figure 28:
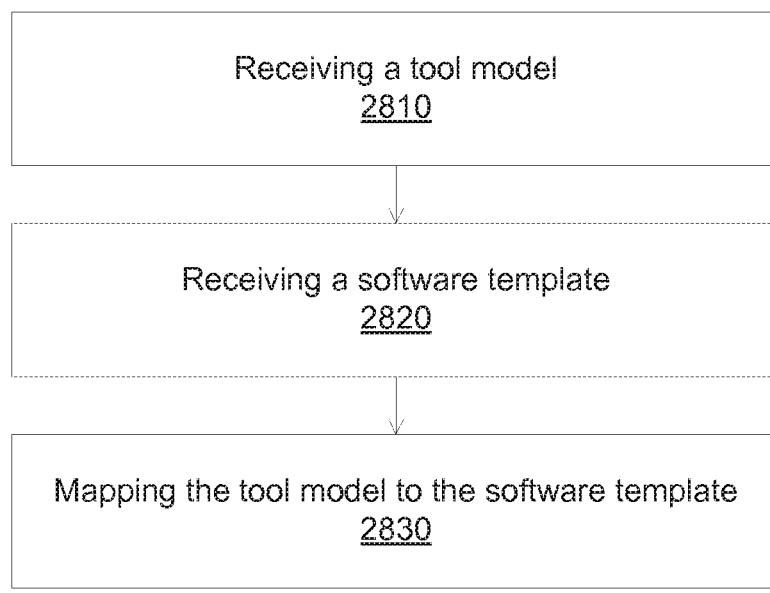
FIG. 28 illustrates a flow chart for mapping a tool model to a software template according to some embodiments.

FIG. 28 illustrates a flow chart for mapping a tool model to a software template according to some embodiments. Operation 2810 receives a tool model. Operation 2820 receives a software template. Operation 2830 maps the tool model to the software template.

FIGS. 29A-29B illustrate flow charts for generating a software template according to some embodiments. In FIG. 29A, operation 2900 generates a software template, wherein the software template program is configured to operate a tool, wherein the software template program comprises place-holder commands.

In FIG. 29B, operation 2920 generates a plurality of modules of a tool. Operation 2930 generates commands and status for each module. Operation 2940 generates commands and status for running the tool. Operation 2950 generates data collection procedures. Operation 2960 generates mapping procedures to replace the commands and status.

FIGS. 30A-30B illustrate flow charts for generating a software template according to some embodiments. In FIG. 30A, operation 3000 generates a software template, wherein the software template program is configured to test the components of a tool, wherein the software template program comprises place-holder commands.

In FIG. 30B, operation 3020 generates a plurality of modules. Operation 3030 generates commands and status for each module. Operation 3040 generates procedures for creating user-defined commands. Operation 3050 generates data collection procedures. Operation 3060 generates mapping procedures to replace the commands and status.

FIGS. 31A-31B illustrate flow charts for generating a software according to some embodiments. In FIG. 31A, operation 3110 generates a tool model of a tool. Operation 3120 automatically generates a documentation of the tool based on the tool model. Operation 3130 automatically generates a software of the tool based on the tool model, wherein the documentation and the software are automatically synchronized.

In FIG. 31B, operation 3150 amending a tool model of a tool. Operation 3160 automatically generates a documentation of the tool based on the amended tool model. Operation 3170 automatically generates a software of the tool based on the amended tool model, wherein the documentation and the software are automatically synchronized for the amendment.

In some embodiments, systems and methods are provided for a software template for the generation of a software program from a tool model input. The software template can be configured to perform a function for a tool. The software template can contain place-holder commands, graphic elements, input and output files. By mapping a tool model to the software template, a software program specific for the tool can be automatically generated.

In some embodiments, provided is a machine readable storage, having stored thereon a computer program having a plurality of code sections for causing a machine to perform the various steps and/or implement the components and/or structures disclosed herein.

In some embodiments, the methods can be realized in hardware, software, or a combination of hardware and software. The methods can be realized in a centralized fashion in a data processing system, such as a computer system or in a distributed fashion where different elements are spread across several interconnected computer systems. Any kind of computer system or other apparatus adapted for carrying out the methods described herein can be used. A typical combination of hardware and software can be a general-purpose computer system with a computer program that can control the computer system so that the computer system can perform the methods. The methods also can be embedded in a computer program product, which includes the features allowing the implementation of the methods, and which when loaded in a computer system, can perform the methods.

The terms "computer program", "software", "application", variants and/or combinations thereof, in the context of the present specification, mean any expression, in any language, code or notation, of a set of instructions intended to cause a system having an information processing capability to perform a particular function either directly. The functions can include a conversion to another language, code or notation, or a reproduction in a different material form. For example, a computer program can include a subroutine, a function, a procedure, an object method, an object implementation, an executable application, an applet, a servlet, a source code, an object code, a shared library/dynamic load library and/or other sequence of instructions designed for execution on a data processing system, such as a computer.

In some embodiments, the methods can be implemented using a data processing system, such as a general purpose computer system. A general purpose computer system can include a graphical display monitor with a graphics screen for the display of graphical and textual information, a keyboard for textual entry of information, a mouse for the entry of graphical data, and a computer processor. In some embodiments, the computer processor can contain program code to implement the methods. Other devices, such as a light pen (not shown), can be substituted for the mouse. This general purpose computer may be one of the many types well known in the art, such as a mainframe computer, a minicomputer, a workstation, or a personal computer.

Having thus described certain preferred embodiments of the present invention, it is to be understood that the inven- tion defined by the appended claims is not to be limited by particular details set forth in the above description, as many apparent variations thereof are possible without departing from the spirit or scope thereof as hereinafter claimed.

What is claimed is:

1. A method comprising:
    receiving data, from a tool machine, of a running machine characteristic, embodying at least a real operational state of the tool machine, and providing the received running machine characteristic to a processor of a tool modeling apparatus;
    generating, with the processor of the tool modeling apparatus, a tool machine model based on the running machine characteristic so that the tool machine model comprises at least one of a text, a graphic, and a software program describing the real operational state of the tool machine; and
    converting the tool machine model into a manual for the tool machine based on the real operational state of the tool machine described in the tool machine model and using one or more templates.

2. A method as in claim 1 further comprising retrieving information from the template, wherein the template comprises a file having formatting information or a database, to assist in the generation of the manual.

3. A method as in claim 1 wherein the template comprises a language template for allowing the generation of the manual having a desired language.

4. A method as in claim 1 wherein converting the tool machine model into the manual comprises
    running a template engine, wherein the template engine is operable to accept the tool machine model, together with at least one of a figure template for figure generation and a document template for document generation, wherein the template engine is operable to generate at least one of a figure file comprising instructions for figure generation and a document file comprising instructions for document generation;
    running a processor, wherein the processor is operable to accept the at least one of a figure file and a text file, wherein the processor is operable to generate the manual.

5. A method as in claim 1 further comprising automatically generating a software program for the tool machine corresponded to the manual.

6. A method as in claim 1 further comprising
    updating the tool machine model;
    automatically generating an updated manual for the updated tool machine model;
    automatically generating an updated software program for the tool machine corresponded to the updated manual.

7. A method comprising
    receiving data, from a tool machine, of a running machine characteristic, embodying at least a real operational state of the tool machine, and providing the received running machine characteristic to a processor of a tool modeling apparatus;
    generating, with the processor of the tool modeling apparatus, a tool machine model based on the running machine characteristic so that the tool machine model comprises at least one of a text, a graphic, and a software program describing the real operational state of the tool machine model; and
    converting the tool machine model into a software program for the tool machine based on the real operational state of the tool machine described in the tool machine model and using one or more templates.

8. A method as in claim 7 wherein
    the tool machine comprises a plurality of modules,
    wherein at least a first module is assembled,
    wherein at least a second module is not assembled, and
    wherein the software program is operable to test the at least a first module.

9. A method as in claim 7 further comprising
    generating a software program comprises receiving a software template, wherein the software template comprises at least one of place-holder commands, command structures, graphical interface, and default functions,
    mapping the tool machine model to the software template.

10. A method as in claim 7 further comprising automatically generating a manual for the tool machine corresponded to the software program.

11. A method as in claim 7 further comprising automatically generating a user manual for the tool machine for operating the software program.

12. A method as in claim 7 further comprising
    updating the tool machine model;
    automatically generating an updated software program for the updated tool machine model;
    automatically generating an updated manual for the tool machine corresponded to the updated software program.

* * * * *